United States Patent
Lakhdhar et al.

(10) Patent No.: US 12,015,637 B2
(45) Date of Patent: Jun. 18, 2024

(54) SYSTEMS AND METHODS FOR END-TO-END ARCHITECTURES FOR VOICE SPOOFING DETECTION

(71) Applicant: PINDROP SECURITY, INC., Atlanta, GA (US)

(72) Inventors: Khaled Lakhdhar, Atlanta, GA (US); Parav Nagarsheth, Atlanta, GA (US); Tianxiang Chen, Atlanta, GA (US); Elie Khoury, Atlanta, GA (US)

(73) Assignee: Pindrop Security, Inc., Atlanta, GA (US)

( * ) Notice: Subject to any disclaimer, the term of this patent is extended or adjusted under 35 U.S.C. 154(b) by 1067 days.

(21) Appl. No.: 16/841,473

(22) Filed: Apr. 6, 2020

(65) Prior Publication Data
US 2020/0322377 A1    Oct. 8, 2020

Related U.S. Application Data

(60) Provisional application No. 62/831,041, filed on Apr. 8, 2019.

(51) Int. Cl.
*H04L 9/40* (2022.01)
*G06F 17/18* (2006.01)
(Continued)

(52) U.S. Cl.
CPC .......... *H04L 63/1466* (2013.01); *G06F 17/18* (2013.01); *G06N 3/045* (2023.01);
(Continued)

(58) Field of Classification Search
CPC ..... H04L 63/14; H04L 63/1466; G06N 3/045; G06N 3/084; G10L 17/00; G10L 17/18; G10L 17/26
See application file for complete search history.

(56) References Cited

U.S. PATENT DOCUMENTS

| 4,817,156 A | 3/1989 | Bahl et al. |
| 4,829,577 A | 5/1989 | Kuroda et al. |

(Continued)

FOREIGN PATENT DOCUMENTS

| WO | WO-2015/079885 | 6/2015 |
| WO | WO-2016/195261 A1 | 12/2016 |

(Continued)

OTHER PUBLICATIONS

Dinkel et al., "End-to-end spoofing detection with raw waveform CLDNNS." 2017 IEEE International Conference on Acoustics, Speech and Signal Processing (ICASSP). IEEE (Year: 2017).*

(Continued)

*Primary Examiner* — Samuel G Neway
(74) *Attorney, Agent, or Firm* — Foley & Lardner LLP

(57) ABSTRACT

Embodiments described herein provide for automatically detecting whether an audio signal is a spoofed audio signal or a genuine audio signal. A spoof detection system can include an audio signal transforming front end and a classification back end. Both the front end and the back end can include neural networks that can be trained using the same set of labeled audio signals. The audio signal transforming front end can include a one or more neural networks for per-channel energy normalization transformation of the audio signal, and the back end can include a convolution neural network for classification into spoofed or genuine audio signal. In some embodiments, the transforming audio signal front end can include one or more neural networks for bandpass filtering of the audio signals, and the back end can include a residual neural network for audio signal classification into spoofed or genuine audio signal.

22 Claims, 8 Drawing Sheets

(51) Int. Cl.
*G06N 3/045* (2023.01)
*G06N 3/084* (2023.01)
*G06N 20/10* (2019.01)
*G10L 17/00* (2013.01)
*G10L 17/04* (2013.01)
*G10L 17/26* (2013.01)
*G10L 19/26* (2013.01)
*H04L 65/75* (2022.01)

(52) U.S. Cl.
CPC ............. *G06N 3/084* (2013.01); *G06N 20/10* (2019.01); *G10L 17/00* (2013.01); *G10L 17/04* (2013.01); *G10L 17/26* (2013.01); *G10L 19/26* (2013.01); *H04L 65/75* (2022.05)

(56) References Cited

U.S. PATENT DOCUMENTS

| | | |
|---|---|---|
| 4,972,485 A | 11/1990 | Dautrich et al. |
| 5,072,452 A | 12/1991 | Brown et al. |
| 5,461,697 A | 10/1995 | Nishimura et al. |
| 5,475,792 A | 12/1995 | Stanford et al. |
| 5,598,507 A | 1/1997 | Kimber et al. |
| 5,659,662 A | 8/1997 | Wilcox et al. |
| 5,835,890 A | 11/1998 | Matsui et al. |
| 5,867,562 A | 2/1999 | Scherer |
| 5,949,874 A | 9/1999 | Mark |
| 5,995,927 A | 11/1999 | Li |
| 6,009,392 A | 12/1999 | Kanevsky et al. |
| 6,021,119 A | 2/2000 | Derks et al. |
| 6,055,498 A | 4/2000 | Neumeyer et al. |
| 6,094,632 A | 7/2000 | Hattori |
| 6,141,644 A | 10/2000 | Kuhn et al. |
| 6,411,930 B1 | 6/2002 | Burges |
| 6,463,413 B1 | 10/2002 | Applebaum et al. |
| 6,519,561 B1 | 2/2003 | Farrell et al. |
| 6,760,701 B2 | 7/2004 | Sharma et al. |
| 6,882,972 B2 | 4/2005 | Kompe et al. |
| 6,922,668 B1 | 7/2005 | Downey |
| 6,975,708 B1 | 12/2005 | Scherer |
| 7,003,460 B1 | 2/2006 | Bub et al. |
| 7,209,881 B2 | 4/2007 | Yoshizawa et al. |
| 7,295,970 B1 | 11/2007 | Gorin et al. |
| 7,318,032 B1 | 1/2008 | Chaudhari et al. |
| 7,324,941 B2 | 1/2008 | Choi et al. |
| 7,739,114 B1 | 6/2010 | Chen et al. |
| 7,813,927 B2 | 10/2010 | Navratil et al. |
| 8,046,230 B1 | 10/2011 | McIntosh |
| 8,112,160 B2 | 2/2012 | Foster |
| 8,160,811 B2 | 4/2012 | Prokhorov |
| 8,160,877 B1 | 4/2012 | Nucci et al. |
| 8,385,536 B2 | 2/2013 | Whitehead |
| 8,484,023 B2 | 7/2013 | Kanevsky et al. |
| 8,484,024 B2 | 7/2013 | Kanevsky et al. |
| 8,554,563 B2 | 10/2013 | Aronowitz |
| 8,712,760 B2 | 4/2014 | Hsia et al. |
| 8,738,442 B1 | 5/2014 | Liu et al. |
| 8,856,895 B2 | 10/2014 | Perrot |
| 8,886,663 B2 | 11/2014 | Gainsboro et al. |
| 8,903,859 B2 | 12/2014 | Zeppenfeld et al. |
| 9,042,867 B2 | 5/2015 | Gomar |
| 9,064,491 B2 | 6/2015 | Rachevsky et al. |
| 9,277,049 B1 | 3/2016 | Danis |
| 9,336,781 B2 | 5/2016 | Scheffer et al. |
| 9,338,619 B2 | 5/2016 | Kang |
| 9,343,067 B2 | 5/2016 | Ariyaeeinia et al. |
| 9,344,892 B1 | 5/2016 | Rodrigues et al. |
| 9,355,646 B2 | 5/2016 | Oh et al. |
| 9,373,330 B2 | 6/2016 | Cumani et al. |
| 9,401,143 B2 | 7/2016 | Senior et al. |
| 9,401,148 B2 | 7/2016 | Lei et al. |
| 9,406,298 B2 | 8/2016 | Cumani et al. |
| 9,431,016 B2 | 8/2016 | Aviles-Casco et al. |
| 9,444,839 B1 | 9/2016 | Faulkner et al. |
| 9,454,958 B2 | 9/2016 | Li et al. |
| 9,460,722 B2 | 10/2016 | Sidi et al. |
| 9,466,292 B1 | 10/2016 | Lei et al. |
| 9,502,038 B2 | 11/2016 | Wang et al. |
| 9,514,753 B2 | 12/2016 | Sharifi et al. |
| 9,558,755 B1 | 1/2017 | Laroche et al. |
| 9,584,946 B1 | 2/2017 | Lyren et al. |
| 9,620,145 B2 | 4/2017 | Bacchiani et al. |
| 9,626,971 B2 | 4/2017 | Rodriguez et al. |
| 9,633,652 B2 | 4/2017 | Kurniawati et al. |
| 9,641,954 B1 | 5/2017 | Typrin et al. |
| 9,665,823 B2 | 5/2017 | Saon et al. |
| 9,685,174 B2 | 6/2017 | Karam et al. |
| 9,729,727 B1 | 8/2017 | Zhang |
| 9,818,431 B2 | 11/2017 | Yu |
| 9,860,367 B1 | 1/2018 | Jiang et al. |
| 9,875,739 B2 | 1/2018 | Ziv et al. |
| 9,875,742 B2 | 1/2018 | Gorodetski et al. |
| 9,875,743 B2 | 1/2018 | Gorodetski et al. |
| 9,881,617 B2 | 1/2018 | Sidi et al. |
| 9,930,088 B1 | 3/2018 | Hodge |
| 9,984,706 B2 | 5/2018 | Wein |
| 10,277,628 B1 | 4/2019 | Jakobsson |
| 10,325,601 B2 | 6/2019 | Khoury et al. |
| 10,347,256 B2 | 7/2019 | Khoury et al. |
| 10,404,847 B1 | 9/2019 | Unger |
| 10,506,088 B1 | 12/2019 | Singh |
| 10,638,214 B1 | 4/2020 | Delhoume et al. |
| 10,659,605 B1 | 5/2020 | Braundmeier et al. |
| 10,679,630 B2 | 6/2020 | Khoury et al. |
| 10,854,205 B2 | 12/2020 | Khoury et al. |
| 11,069,352 B1 | 7/2021 | Tang et al. |
| 2002/0095287 A1 | 7/2002 | Botterweck |
| 2002/0143539 A1 | 10/2002 | Botterweck |
| 2003/0231775 A1 | 12/2003 | Wark |
| 2003/0236663 A1 | 12/2003 | Dimitrova et al. |
| 2004/0218751 A1 | 11/2004 | Colson et al. |
| 2004/0230420 A1 | 11/2004 | Kadambe et al. |
| 2005/0038655 A1 | 2/2005 | Mutel et al. |
| 2005/0039056 A1 | 2/2005 | Bagga et al. |
| 2005/0286688 A1 | 12/2005 | Scherer |
| 2006/0058998 A1 | 3/2006 | Yamamoto et al. |
| 2006/0111905 A1 | 5/2006 | Navratil et al. |
| 2006/0293771 A1 | 12/2006 | Tazine et al. |
| 2007/0019825 A1 | 1/2007 | Marumoto et al. |
| 2007/0189479 A1 | 8/2007 | Scherer |
| 2007/0198257 A1 | 8/2007 | Zhang et al. |
| 2007/0294083 A1 | 12/2007 | Bellegarda et al. |
| 2008/0195389 A1 | 8/2008 | Zhang et al. |
| 2008/0312926 A1 | 12/2008 | Vair et al. |
| 2009/0138712 A1 | 5/2009 | Driscoll |
| 2009/0265328 A1 | 10/2009 | Parekh et al. |
| 2010/0131273 A1 | 5/2010 | Aley-Raz et al. |
| 2010/0217589 A1 | 8/2010 | Gruhn et al. |
| 2010/0232619 A1 | 9/2010 | Uhle et al. |
| 2010/0262423 A1 | 10/2010 | Huo et al. |
| 2011/0010173 A1 | 1/2011 | Scott et al. |
| 2012/0173239 A1* | 7/2012 | Sanchez ............... G10L 17/06 704/E17.001 |
| 2012/0185418 A1 | 7/2012 | Capman et al. |
| 2013/0041660 A1 | 2/2013 | Waite |
| 2013/0080165 A1 | 3/2013 | Wang et al. |
| 2013/0109358 A1 | 5/2013 | Balasubramaniyan et al. |
| 2013/0300939 A1 | 11/2013 | Chou et al. |
| 2014/0046878 A1 | 2/2014 | Lecomte et al. |
| 2014/0053247 A1 | 2/2014 | Fadel |
| 2014/0081640 A1* | 3/2014 | Farrell ............... G10L 17/24 704/249 |
| 2014/0195236 A1 | 7/2014 | Hosom et al. |
| 2014/0214417 A1 | 7/2014 | Wang et al. |
| 2014/0214676 A1* | 7/2014 | Bukai ............... G10L 17/24 705/44 |
| 2014/0241513 A1 | 8/2014 | Springer |
| 2014/0250512 A1 | 9/2014 | Goldstone et al. |
| 2014/0278412 A1 | 9/2014 | Scheffer et al. |
| 2014/0288928 A1* | 9/2014 | Penn ............... G10L 15/16 704/232 |
| 2014/0337017 A1 | 11/2014 | Watanabe et al. |
| 2015/0036813 A1 | 2/2015 | Ananthakrishnan et al. |
| 2015/0127336 A1 | 5/2015 | Lei et al. |

(56) References Cited

U.S. PATENT DOCUMENTS

| | | | |
|---|---|---|---|
| 2015/0149165 A1 | 5/2015 | Saon | |
| 2015/0161522 A1 | 6/2015 | Saon et al. | |
| 2015/0189086 A1 | 7/2015 | Romano et al. | |
| 2015/0199960 A1 | 7/2015 | Huo et al. | |
| 2015/0269931 A1 | 9/2015 | Senior et al. | |
| 2015/0269941 A1* | 9/2015 | Jones | H04M 3/42221 704/273 |
| 2015/0310008 A1 | 10/2015 | Thudor et al. | |
| 2015/0334231 A1 | 11/2015 | Rybak et al. | |
| 2015/0348571 A1 | 12/2015 | Koshinaka et al. | |
| 2015/0356630 A1 | 12/2015 | Hussain | |
| 2015/0365530 A1 | 12/2015 | Kolbegger et al. | |
| 2016/0019458 A1 | 1/2016 | Kaufhold | |
| 2016/0019883 A1 | 1/2016 | Aronowitz | |
| 2016/0028434 A1 | 1/2016 | Kerpez et al. | |
| 2016/0078863 A1 | 3/2016 | Chung et al. | |
| 2016/0104480 A1 | 4/2016 | Sharifi | |
| 2016/0125877 A1 | 5/2016 | Foerster et al. | |
| 2016/0180214 A1 | 6/2016 | Kanevsky et al. | |
| 2016/0189707 A1 | 6/2016 | Donjon et al. | |
| 2016/0240190 A1 | 8/2016 | Lee et al. | |
| 2016/0275953 A1 | 9/2016 | Sharifi et al. | |
| 2016/0284346 A1 | 9/2016 | Visser et al. | |
| 2016/0293167 A1 | 10/2016 | Chen et al. | |
| 2016/0314790 A1* | 10/2016 | Tsujikawa | G10L 17/06 |
| 2016/0343373 A1 | 11/2016 | Ziv et al. | |
| 2017/0060779 A1 | 3/2017 | Falk | |
| 2017/0069313 A1 | 3/2017 | Aronowitz | |
| 2017/0069327 A1* | 3/2017 | Heigold | G10L 17/04 |
| 2017/0098444 A1 | 4/2017 | Song | |
| 2017/0126884 A1 | 5/2017 | Balasubramaniyan et al. | |
| 2017/0142150 A1 | 5/2017 | Sandke et al. | |
| 2017/0169816 A1 | 6/2017 | Blandin et al. | |
| 2017/0230390 A1 | 8/2017 | Faulkner et al. | |
| 2017/0262837 A1 | 9/2017 | Gosalia | |
| 2018/0082691 A1 | 3/2018 | Khoury et al. | |
| 2018/0082692 A1* | 3/2018 | Khoury | G10L 17/20 |
| 2018/0152558 A1 | 5/2018 | Chan et al. | |
| 2018/0249006 A1 | 8/2018 | Dowlatkhah et al. | |
| 2018/0254046 A1* | 9/2018 | Khoury | G10L 19/02 |
| 2018/0268023 A1* | 9/2018 | Korpusik | G06F 40/30 |
| 2018/0295235 A1 | 10/2018 | Tatourian et al. | |
| 2018/0337962 A1 | 11/2018 | Ly et al. | |
| 2019/0037081 A1 | 1/2019 | Rao et al. | |
| 2019/0172476 A1 | 6/2019 | Wung et al. | |
| 2019/0174000 A1 | 6/2019 | Bharrat et al. | |
| 2019/0180758 A1* | 6/2019 | Washio | G10L 15/26 |
| 2019/0238956 A1 | 8/2019 | Gaubitch et al. | |
| 2019/0297503 A1 | 9/2019 | Traynor et al. | |
| 2020/0035224 A1* | 1/2020 | Ward | G10L 15/22 |
| 2020/0137221 A1 | 4/2020 | Dellostritto et al. | |
| 2020/0195779 A1 | 6/2020 | Weisman et al. | |
| 2020/0252510 A1 | 8/2020 | Ghuge et al. | |
| 2020/0312313 A1 | 10/2020 | Maddali et al. | |
| 2020/0322377 A1* | 10/2020 | Lakhdhar | H04L 65/75 |
| 2020/0396332 A1 | 12/2020 | Gayaldo | |
| 2021/0084147 A1 | 3/2021 | Kent et al. | |
| 2021/0150010 A1 | 5/2021 | Strong et al. | |

FOREIGN PATENT DOCUMENTS

| | | | |
|---|---|---|---|
| WO | WO-2017/167900 A1 | 10/2017 | |
| WO | WO-2018/049313 | 3/2018 | |

OTHER PUBLICATIONS

Chen et al., "ResNet and Model Fusion for Automatic Spoofing Detection." Interspeech. (Year: 2017).*
Ravanelli et al., "Speaker recognition from raw waveform with sincnet." 2018 IEEE spoken language technology workshop (SLT). IEEE (Year: 2018).*
International Preliminary Report on Patentability, Ch. I, for PCT/US2020/026992 dated Oct. 21, 2021 (10 pages).
Foreign Action on JP 2019-535198 dated Mar. 1, 2022 (6 pages).
Notice of Allowance on U.S. Appl. No. 16/536,293 dated Jun. 3, 2022 (9 pages).
Examination Report for IN 201947014575 dated Nov. 16, 2021 (6 pages).
Atrey, et al., "Audio based event detection for multimedia surveillance", Acoustics, Speech and Signal Processing, 2006, ICASSP 2006 Proceedings, 2006 IEEE International Conference on vol. 5, IEEE, 2006. pp. 813-816.
Cheng-I Lai et al: "Assert: Anti-Spoofing with Squeeze-Excitation and Residual Networks", arxiv.org, Cornell University Library, Ithaca, NY 14853, Apr. 1, 2019.
D.Etter and C.Domniconi, "Multi2Rank: Multimedia Multiview Ranking," 2015 IEEE International Conference on Multimedia Big Data, 2015, pp. 80-87. (Year 2015).
Foreign Search Report on EP 20786776.3, dated Dec. 1, 2022 (11 pages).
International Search Report and Written Opinion for PCT/US2020/24709 dated Jun. 19, 2020 (10 pages).
International Search Report and Written Opinion issued in the corresponding International Application No. PCT/US2017/039697, dated Sep. 20, 2017. 17 pages.
Luque, et al., "Clustering Initialization Based on Spatial Information for Speaker Diarization of Meetings", Ninth Annual Conference of the International Speech Communication Association, 2008. pp. 383-386.
Meignier, et al., "Lium Spkdiarization: An Open Source Toolkit for Diarization" CMU SPUD Workshop, 2010. 7 pages.
Novoselov, et al., "SIC Speaker Recognition System for the NIST i-Vector Challenge." Odyssey: The Speaker and Language Recognition Workshop. Jun. 16-19, 2014. pp. 231-240.
Oguzhan et al., "Recognition of Acoustic Events Using Deep Neural Networks", 2014 22nd European Signal Processing Conference (EUSiPCO), Sep. 1, 2014, pp. 506-510 (5 pages).
Piegeon, et al., "Applying Logistic Regression to the Fusion of the NIST'99 1-Speaker Submissions", Digital Signal Processing Oct. 1-3, 2000. pp. 237-248.
Prazak et al., "Speaker Diarization Using PLDA-based Speaker Clustering", The 6th IEEE International Conference on Intelligent Data Acquisition and Advanced Computing Systems: Technology and Applications, Sep. 2011, pp. 347-350 (4 pages).
Rouvier et al., "An Open-source State-of-the-art Toolbox for Broadcast News Diarization", Interspeech, Aug. 2013, pp. 1477-1481 (5 pages).
Shajeesh, et al., "Speech Enhancement based on Savitzky-Golay Smoothing Filter", International Journal of Computer Applications, vol. 57, No. 21, Nov. 2012, pp. 39-44 (6 pages).
Shum et al., "Exploiting Intra-Conversation Variability for Speaker Diarization", Interspeech, Aug. 2011, pp. 945-948 (4 pages).
T.C.Nagavi, S.B. Anusha, P.Monisha and S.P.Poornima, "Content based audio retrieval with MFCC feature extraction, clustering and sort-merge techniquest," 2013 Fourth International Conference on Computing, Communications and Networking Technologies (ICCCNT), 2013, pp. 1-6. (Year 2013).
Temko, et al., "Acoustic event detection in meeting-room environments", Pattern Recognition Letters, vol. 30, No. 14, 2009, pp. 1281-1288.
Temko, et al., "Classification of acoustic events using SVM-based clustering schemes", Pattern Recognition, vol. 39, No. 4, 2006, pp. 682-694.
Xue et al., "Fast Query by Example of Enviornmental Sounds Via Robust and Efficient Cluster-Based Indexing", Acoustics, Speech and Signal Processing (ICASSP), IEEE, 2008, pp. 5-8 (4 pages).
Hoffer et al., "Deep Metric Learning Using Triplet Network", 2015, arXiv: 1412.6622v3, retrieved Oct. 4, 2021 from URL: https://deepsense.ai/wp-content/uploads/2017/08/1412.6622-3.pdf (8 pages).
Reasons for Refusal for JP 2019-535198 dated Sep. 10, 2021 (7 pages).
Uzan et al., "I Know That Voice: Identifying the Voice Actor Behind the Voice", 2015 International Conference on Biometrics (ICB), 2015, retrieved Oct. 4, 2021 from URL: https://citeseerx.ist.psu.edu/viewdoc/download?doi=10.1.1.715.8031&rep=rep1&type=pdf (6 pages).

(56) References Cited

OTHER PUBLICATIONS

Wang et al., "Learning Fine-Grained Image Similarity with Deep Ranking", Computer Vision and Pattern Recognition, Jan. 17, 2014, arXiv: 1404.4661v1, retrieved Oct. 4, 2021 from URL: https://arxiv.org/pdf/1404.4661.pdf (8 pages).
Examination Report No. 1 for AU 2017322591 dated Jul. 16, 2021 (2 pages).
Fu et al., "SNR-Aware Convolutional Neural Network Modeling for Speech Enhancement", Interspeech 2016, Sep. 8-12, 2016, pp. 3768-3772, XP055427533, ISSN: 1990-9772, DOI: 10.21437/Interspeech.2016-211 (5 pages).
International Preliminary Report on Patentability for PCT/US2020/017051 dated Aug. 19, 2021 (11 pages).
International Preliminary Report on Patentability, Ch. I, for PCT/US2017/052335 dated Mar. 19, 2019 (8 pages).
International Search Report and Written Opinion for PCT/US20/17051 dated Apr. 23, 2020 (12 pages).
International Search Report and Written Opinion for PCT/US2017/052335 dated Dec. 8, 2017 (10 pages).
Kenny, "A Small Footprint i-Vector Extractor" Proc. Odyssey Speaker and Language Recognition Workshop, Singapore, Jun. 25, 2012. 6 pages.
Richardson, et al., Speaker Recognition Using Real vs Synthetic Parallel Data for DNN Channel Compensation, Interspeech, 2016, retrieved Sep. 14, 2021 from URL: https://www.ll.mit.edu/sites/default/files/publication/doc/2018-05/2016-Richardson-Interspeech.pdf (6 pages).
Xu et al., "Rapid Computation of I-Vector" Odyssey, Bilbao, Spain, Jun. 21-24, 2016. 6 pages.
Zheng, et al., "An Experimental Study of Speech Emotion Recognition Based on Deep Convolutional Neural Networks", 2015 International Conference on Affective Computing and Intelligent Interaction (ACII), 2015, pp. 827-831 (5 pages).
Ahmad et al., A unique approach in text independent speaker recognition using MFCC feature sets and probabilistic neural network. In 2015 Eighth International Conference on Advances in Pattern Recognition (ICAPR}, pp. 1-6, IEEE, 2015.
Almaadeed, et al., "Speaker identification using multimodal neural networks and wavelet analysis," IET Biometrics 4.1 (2015), 18-28.
Anguera, et al., "Partial sequence matching using an Unbounded Dynamic Time Warping algorithm", IEEE ICASSP, Apr. 2010, pp. 3582-3585.
Atrey, et al., "Audio based event detection for multimedia surveillance", Acoustics, Speech and Signal Processing, 2006, ICASSP 2006 Proceedings, 2006 IEEE International Conference on vol. 5, IEEE, 2006.
Baraniuk, "Compressive Sensing [Lecture Notes]", IEEE Signal Processing Magazine, vol. 24, Jul. 2007, pp. 1-9.
Bredin, "TristouNet: Triplet Loss for Speaker Turn Embedding", Arxiv.org, Cornell University Library, 201 Olin Library Cornell University Ithaca, NY 14853, Sep. 14, 2016, XP080726602.
Castaldo et al., "Compensation of Nuisance Factors for Speaker and Language Recognition," IEEE Transactions on Audio, Speech and Language Processing, ieeexplore.ieee.org, vol. 15, No. 7, Sep. 2007.
Communication pursuant to Article 94(3) EPC issued in corresponding Application No. EP 17778046.7 dated Jun. 16, 2020.
Communication pursuant to Article 94(3) EPC issued in EP Application No. 17 772 184.2-1207 dated Jul. 19, 2019.
Communication pursuant to Article 94(3) EPC on EP 17772184.2 dated Jun. 18, 2020.
Cumani, et al., "Factorized Sub-space Estimation for Fast and Memory Effective i-Vector Extraction", IEEE/ACM TASLP, vol. 22, Issue 1, Jan. 2014, pp. 248-259.
Dehak, et al., "Front-end factor analysis for speaker verification", IEEE Transactions on Audio, Speech, and Language Processing, vol. 19, No. 4, (2011), pp. 788-798.
Douglas A. Reynolds et al., "Speaker Verification Using Adapted Gaussian Mixture Models," Digital Signal Processing 10, 2000, pp. 19-41.
El-Khoury, et al., "Improved speaker diarization system for meetings", Acoustics, Speech and Signal Processing, 2009, ICASSP 2009, IEEE International Conference on IEEE, 2009.
First Office Action issued in KR 10-2019-7010-7010208 dated Jun. 29, 2019.
First Office Action issued on CA Application No. 3,036,533 dated Apr. 12, 2019.
First Office Action on CA Application No. 3,075,049 dated May 7, 2020.
Florian et al., "FaceNet: A unified embedding for face recognition and clustering", 2015 IEEE Conference on Computer Vision and Pattern Recognition (CVPR), IEEE, Jun. 7, 2015, pp. 815-823, XP032793492, DOI: 10.1109/CVPR.2015.7298682.
Fu et al., "SNR-Aware Convolutional Neural Network Modeling for Speech Enhancement", Interspeech 2016, vol. 2016, Sep. 8, 2016, pp. 3768-3772, XP055427533, ISSN: 1990-9772, DOI: 10.21437/Interspeech.2016-211.
Gao, et al., "Dimensionality Reduction via Compressive Sensing", Pattern Recognition Letters 33, Elsevier Science BV 0167-8655, 2012.
Garcia-Romero et al., "Unsupervised Domain Adaptation for i-vector Speaker Recognition," Odyssey 2014, pp. 260-264.
Ghahabi Omid et al., "Restricted Boltzmann Machine Supervectors for Speaker Recognition," 2015 IEEE International Conference on acoustics, Speech and Signal Processing (ICASSP}, IEEE, Apr. 19, 2015, pp. 4804-4808, XP033187673.
Gish, et al., "Segregation of speakers for speech recognition and speaker identification", Acoustics, Speech, and Signal Processing, 1991, ICASSP-91, 1991 International Conference on IEEE, 1991.
Hoffer, et al. "Deep Metric Learning Using Triplet Network", ICLR 2015 (workshop contribution), Mar. 23, 2015, retrieved from <https://arxiv.org/pdf/1412.6622v3.pdf> on Dec. 8, 2016.
Huang, et al., "A blind segmentation approach to acoustic event detection based on i-vector", Interspeech, 2013.
International Preliminary Report on Patentability and Written Opinion issued in corresponding International Application No. PCT/US2017/052335 dated Mar. 19, 2019.
International Preliminary Report on Patentability and Written Opinion of the International Searching Authority issued in International Application No. PCT/US2017/052293 dated Mar. 19, 2019.
International Preliminary Report on Patentability and Written Opinion of the International Searching Authority issued in International Application No. PCT/US2017/052316 dated Mar. 19, 2019.
International Search Report and The Written Opinion of the International Searching Authority, or the Declaration issued in International Application No. PCT/US20/17051 dated Apr. 23, 2020.
International Search Report and Written Opinion in corresponding PCT Application PCT/US2017/052335, dated Dec. 8, 2017, 10 pages.
International Search Report and Written Opinion issued in corresponding International Application No. PCT/US2018/013965 dated May 14, 2018.
International Search Report and Written Opinion issued in International Application No. PCT/US20/26992 dated Jun. 26, 2020.
International Search Report and Written Opinion issued in the corresponding International Application No. PCT/US2017/039697, dated Sep. 20, 2017.
International Search Report and Written Opinion of the International Searching Authority issued in corresponding International Application No. PCT/US2017/050927 dated Dec. 11, 2017.
International Search Report issued in corresponding International Application No. PCT/US2017/052293 dated Dec. 21, 2017.
International Search Report issued in corresponding International Application No. PCT/US2017/052316 dated Dec. 21, 2017.
Kenny et al., "Deep Neural Networks for extracting Baum-Welch statistics for Speaker Recognition", Jun. 29, 2014, XP055361192, Retrieved from the Internet: URL:http://www.crim.ca/perso/patrick.kenny/stafylakis_odyssey2014_v2.pdf, [retrieved on Apr. 3, 2017].
Kenny, "A Small Footprint i-Vector Extractor" Proc. Odyssey Speaker and Language Recognition Workshop, Singapore, Jun. 25, 2012.

(56) References Cited

OTHER PUBLICATIONS

Khoury et al., "Combining transcription-based and acoustic-based speaker identifications for broadcast news," ICASSP, Kyoto, Japan, 2012, pp. 4377-4380.
Khoury et al., "Hierarchical speaker clustering methods for the NIST i-vector challenge," Odyssey 2014, pp. 254-259.
Kockmann et al., "Syllable Based Feature-Contours for Speaker Recognition," Proc. 14th International Workshop on Advances, 2008.
Korean Office Action (with English summary), dated Jun. 29, 2019, issued in Korean application No. 10-2019-7010208, 6 pages.
Lei et al., "A Novel Scheme for Speaker Recognition Using a Phonetically-aware Deep Neural Network", Proceedings on ICASSP, Florence, Italy, IEEE Press, 2014, pp. 1695-1699.
Luque, et al., "Clustering initialization based on spatial information for speaker diarization of meetings", Ninth Annual Conference of the International Speech Communication Association, 2008.
McLaren, et al., "Advances in deep neural network approaches to speaker recognition," In Proc. 40th IEEE International Conference on Acoustics, Speech and Signal Processing (ICASSP), 2015.
McLaren, et al., "Exploring the Role of Phonetic Bottleneck Features for Speaker and Language Recognition", 2016 IEEE International Conference on Acoustics, Speech and Signal Processing (ICASSP), Mar. 2016, pp. 5575-5579.
Meignier, et al., "LIUM SpkDiarization: an open source toolkit for diarization", CMU SPUD Workshop, 2010.
Novoselov, et al., "SIC speaker recognition system for the NIST i-vector challenge." Odyssey: The Speaker and Language Recognition Workshop. 2014.
Office Action dated Jan. 23, 2020, issued in corresponding Canadian Application No. 3,036,561, 5 pages.
Oguzhan et al., "Recognition of acoustic Events Using deep Neural Networks", 2014 22nd European Signal Processing Conference (EUSiPCO), Sep. 1, 2014, pp. 506-510, XP032681786.
Pigeon, et al., "Applying logistic regression to the fusion of the NIST'99 1-speaker submissions", Digital Signal Processing Oct. 1-3, 2000. pp. 237-248.
Prazak, et al., "Speaker diarization using PLDA-based speaker clustering", Intelligent Data Acquisition and Advanced Computing Systems (IDAACS), 2011 IEEE 6th International Conference on vol. 1, IEEE, 2011.
Prince, et al., "Probabilistic, Linear Discriminant Analysis for Inferences about Identity," Proceedings of the International Conference on Computer Vision, Oct. 14-21, 2007.
Reynolds et al., "Speaker Verification Using Adapted Gaussian Mixture Models," Digital Signal Processing 10, 2000, pp. 19-41.
Richardson, et al., "Channel Compensation for Speaker Recognition using MAP Adapted PLDA and Denoising DNNs", Proc. Speaker Lang. Recognit. Workshop, Jun. 22, 2016, pp. 225-230.
Richardson, et al., "Deep Neural Network Approaches to Speaker and Language Recognition", IEEE Signal Processing Letters, vol. 22, No. 10, Oct. 2015, pp. 1671-1675.
Richardson, et al., "Speaker Recognition Using Real vs Synthetic Parallel Data for DNN Channel Compensation", Interspeech, 2016.
Rouvier, et al., "An open-source state-of-the-art toolbox for broadcast news diarization", Interspeech. 2013.
Scheffer et al., "Content matching for short duration speaker recognition", Interspeech, Sep. 14-18, 2014, pp. 1317-1321.
Schmidt, et al., "Large-scale speaker identification," ICASSP, 2014, pp. 1650-1654.
Seddik, et al., "Text independent speaker recognition using the Mel frequency cepstral coefficients and a neural network classifier." First International Symposium on Control, Communications and Signal Processing, 2004. IEEE, 2004.
Shajeesh, et al., "Speech enhancement based on Savilzky-Golay smoothing filter", International Journal of Computer Applications, vol. 57, No. 21, 2012.
Shum, et al., "Exploiting intra-conversation variability for speaker diarization", Twelfth Annual Conference of the International Speech Communication Association, 2011.
Snyder et al., Time delay deep neural network-based universal background models for speaker recognition. In 2015 IEEE Workshop on Automatic Speech Recognition and Understanding (ASRU) pp. 92-97. IEEE, 2015.
Solomonoff, et al., "Nuisance Attribute Projection", Speech Communication, Elsevier Science BV, Amsterdam, The Netherlands, May 1, 2007.
Sturim et al., "Speaker Linking and Applications Using Non-Parametric Hashing Methods," Interspeech, Sep. 2016, 5 pages.
Summons to attend oral proceedings pursuant to Rule 115(1) EPC issued in EP Application No. 17 772 184.2-1207 dated Dec. 16, 2019.
Vella et al., "Artificial neural network features for speaker diarization", 2014 IEEE Spoken Language Technology Workshop (SLT), IEEE Dec. 7, 2014, pp. 402-406, XP032756972, DOI: 10.1109/SLT.2014.7078608.
Xiang, et al., "Efficient text-independent speaker verification with structural Gaussian mixture models and neural network." IEEE Transactions on Speech and Audio Processing 11.5 (2003): 447-456.
Xu et al., "Rapid Computation of I-Vector" Odyssey, Bilbao, Spain, Jun. 21-34, 2016.
Xue, et al., "Fast query by example of environmental sounds via robust and efficient cluster-based indexing", Acoustics, Speech and Signal Processing, 2008, ICASSP 2008, IEEE International Conference on IEEE, 2008.
Yella Sree Harsha et al., "Artificial neural network features for speaker diarization", 2014 IEEE Spoken Language technology Workshop (SLT), IEEE, Dec. 7, 2014, pp. 402-406, XP032756972, DOI: 10.1109/SLT.2014.7078608.
Zhang et al., "Extracting Deep Neural Network Bottleneck Features using Low-rank Matrix Factorization", IEEE, ICASSP, 2014.
Zheng et al., An experimental study of speech emotion recognition based on deep convolutional neural networks: 2015 International Conference on Affective Computing & Intelligent Interaction (ACII); pp. 827-831, (Year: 2015).
First Examiners Requisition on CA Appl. 3,096,378 dated Jun. 12, 2023 (3 pages).
Buera et al., "Unsupervised Data-Driven Feature Vector Normalization With Acoustic Model Adaptation for Robust Speech Recognition", IEEE Transactions on Audio, Speech, and Language Processing, vol. 18, No. 2, Feb. 2010, pp. 296-309 (14 pages).
Campbell, "Using Deep Belief Networks for Vector-Based Speaker Recognition", Proceedings of Interspeech 2014, Sep. 14, 2014, pp. 676-680, XP055433784.
Examination Report for EP 17778046.7 dated Jun. 16, 2020 (4 pages).
Information Disclosure Statement filed Feb. 12, 2020 (4 pages).
International Preliminary Report on Patentability, Ch. I, for PCT/US2017/052316 dated Mar. 19, 2019 (7 pages).
Non-Final Office Action for U.S. Appl. No. 15/709,232 dated Jun. 27, 2019 (11 pages).
Non-Final Office Action for U.S. Appl. No. 15/709,232 dated Oct. 5, 2018 (21 pages).
Notice of Allowance for U.S. Appl. No. 15/709,024 dated Mar. 18, 2019 (11 pages).
Notice of Allowance for U.S. Appl. No. 15/709,232 dated Feb. 6, 2019 (11 pages).
Notice of Allowance for U.S. Appl. No. 15/709,232 dated Oct. 8, 2019 (11 pages).
Notice of Allowance for U.S. Appl. No. 16/505,452 dated Jul. 23, 2020 (8 pages).
Notice of Allowance for U.S. Appl. No. 16/505,452 dated May 13, 2020 (9 pages).
Notice of Allowance on U.S. Appl. No. 17/107,496 dated Jan. 26, 2023 (8 pages).
Office Action for CA 3036561 dated Jan. 23, 2020 (5 pages).
U.S. Non Final Office Action on U.S. Appl. No. 17/107,496 dated Jul. 21, 2022 (7 pages).
U.S. Notice of Allowance on U.S. Appl. No. 17/107,496 dated Sep. 28, 2022 (8 pages).
Variani et al., "Deep neural networks for small footprint text-dependent speaker verification", 2014 IEEE International Confer-

(56) References Cited

OTHER PUBLICATIONS ence on Acoustics, Speech and Signal Processing (ICASSP), IEEE, May 4, 2014, pp. 4052-4056, XP032617560, DOI: 10.1109/ICASSP. 2014.6854363 [retrieved on Jul. 11, 2014].

Yaman et al., "Bottleneck Features for Speaker Recognition", Proceedings of the Speaker and Language Recognition Workshop 2012, Jun. 28, 2012, pp. 105-108, XP055409424, Retrieved from the Internet: URL:https://pdfs.semanticscholar.org/3469/fe6e53e65bced5736480afe34b6c16728408.pdf [retrieved on Sep. 25, 2017].

Office Action on Japanese Application 2022-104204 dated Jul. 26, 2023 (4 pages).

First Examiner's Requisition for CA App. 3,135,210 dated Oct. 5, 2023 (5 pages).

Office Action from the Japanese Office Action on App. 2022-104204 dated Jan. 6, 2024 (6 pages).

Anonymous: "Filter bank—Wikipedia", Apr. 3, 2024 (Apr. 3, 2024), XP093147551, Retrieved from the Internet: URL:https//en.wikipeida.org/wiki/Filter_bank [retrieved on Apr.3 ,2024].

Database Inspec [Online] The Institution of Electrical Engineers, Stevenage, GB; Sep. 10, 2015 (Sep. 10, 2015), Majeed Sa et al: "Mel Frequency Cepstral Coefficients (MFCC) Feature Extraction Enhancement In The Application Of Speech Recognition: A Comparison Study", Database accession No. 15842570 ; & Journal of Theoretical and Applied Information Technology JATIT Pakistan, vol. 79, No. 1 , pp. 38-56, ISSN: 1992-8645

Examiner's Report on EPO App. 20786776.3 dated Apr. 12, 2024 (6 pages).

Sivakuntaran P et al: "The use of sub-band cepstrum in speaker verification", Acoustics, Speech, and Signal Processing, 2000. ICASSP '00. Proceedings. 2000 IEEE International Conference on Jun. 5-9, 2000, Piscataway, NJ, USA,IEEE, vol. 2, Jun. 5, 2000 (Jun. 5, 2000), pp. 1073-1076, XP010504912, ISBN: 978-0-7803-6293-2

\* cited by examiner

SYSTEMS AND METHODS FOR END-TO-END ARCHITECTURES FOR VOICE SPOOFING DETECTION

CROSS-REFERENCE TO RELATED APPLICATIONS

This application claims priority to U.S. Provisional Application No. 62/831,041, filed Apr. 8, 2019, which is hereby incorporated by reference in its entirety.

This application is related to U.S. patent application Ser. No. 15/262,748, filed Sep. 12, 2016, which is granted as U.S. Pat. No. 9,824,692, and U.S. patent application Ser. No. 15/910,387, filed Mar. 2, 2018, each of which is incorporated by reference in its entirety.

TECHNICAL FIELD

This application generally relates to systems and methods of modeling and classifying incoming calls based on features extracted from audio signals and one or more machine-learning algorithms. It also relates generally to systems and methods for intelligent automated detection of spoofed audio signals and automated generation of models for such detection process.

BACKGROUND

Voice-based interactions are an increasingly common form for interactions between human and machines, and may even become the predominant mode of human-machine interface in the near-future. Voice interfaces implement various types of speech processing systems that identify, ingest, and respond to a user's spoken command, such as automatic speaker verification (ASV), automatic speech recognition (ASR) systems. For security and privacy purposes, ASV systems aim to validate identity assertions from spoken utterances. In order to fully leverage the emergence of voice-based interfaces, particularly at various scales, ASV systems should not only be accurate when identifying and recognizing enrolled speakers, but they should also able to identify and reject spoofed or replayed utterances, which might, for example, purport to be commands of validated, enrolled speakers. What is therefore needed are reliable and efficient countermeasures for spoof detection in ASV implementations.

Although a lot of progress has been made to address "zero-effort" imposters and less-sophisticated attacks, existing ASV systems are often vulnerable to more sophisticated attacks perpetrated, for instance, by forging/spoofing speech. Forged/spoofed speech can be obtained using speech synthesis systems (SS), using unit selection (US) algorithms, or by applying voice conversion (VC) to transform the imposter's speech so it resembles a target enrollee's voice. With the development and the proliferation of these and other audio manipulation and speech synthesis tools, voice spoofing presents a real threat to the efficacy of ASV systems, thereby limiting their usability in the context of security sensitive applications.

Some approaches utilize machine learning techniques to detect spoofed speech signals. For example, some approaches utilize front-end feature extraction, while other approaches focus on classifier architecture. These two approaches make some implied assumptions on the nature and form of discriminative features to be identified by the machine learning process. For example, some approaches determine constant Q cepstral coefficients (CQCCs) that are perceptually inspired time-frequency analysis acoustic features that are found to be powerful at detecting voice spoofing attacks. One reason for this is that the selected acoustic features may not be adapted to evolving spoofing attacks, thereby reducing their accuracy over time.

SUMMARY

Disclosed herein are systems and methods capable of addressing the above described shortcomings and may also provide any number of additional or alternative benefits and advantages. Embodiments described herein provide for systems and methods for end-to-end neural network systems for anti-spoofing processes, as well as other implementations involving processes for automatic speaker verification, caller identification and authentication, and the like. A computer executes software-based machine learning and/or artificial intelligence processes for programmatically training or otherwise generating classification models, which the same or different computer then use for automatically determining whether an audio signal is a spoofed audio signal or a genuine audio signal. The end-to-end neural network spoof detection processes may be configured to operate according to signal processing algorithms, including PCEN-Net and Sinc-ResNet.

In an embodiment, a computer-implemented method for implementing an anti-spoofing end-to-end neural network architecture. The method comprises receiving, by a computer, a raw audio signal of a call purportedly associated with a verified speaker identity; generating, by the computer executing a neural network architecture, a transformed representation of the raw audio signal, thereby resulting in a processed audio signal; and generating, by the computer executing the neural network architecture, a prediction score for the processed audio signal, the prediction score indicating a likelihood the processed audio signal of the call is associated with a spoof of the verified speaker identity; wherein the neural network architecture is trained according to a plurality of raw audio signals having at least one raw audio signal for at least one verified call associated with the verified speaker identity and at least one raw audio signal for at least one spoofed call.

In another embodiment, a computer-implemented method for implementing an anti-spoofing end-to-end neural network architecture. The method comprises executing, by the computer, a neural network architecture on a plurality of audio signals having at least one audio signal associated with at least one spoofed call, the neural network architecture configured to process each audio signal and classify whether each audio signal is associated with a spoofed call; and training, by the computer, a first set of parameters for signal processing based upon one or more loss functions generated for the audio signals.

It is to be understood that both the foregoing general description and the following detailed description are exemplary and explanatory and are intended to provide further explanation of the invention as claimed.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

DETAILED DESCRIPTION

Figure 1:
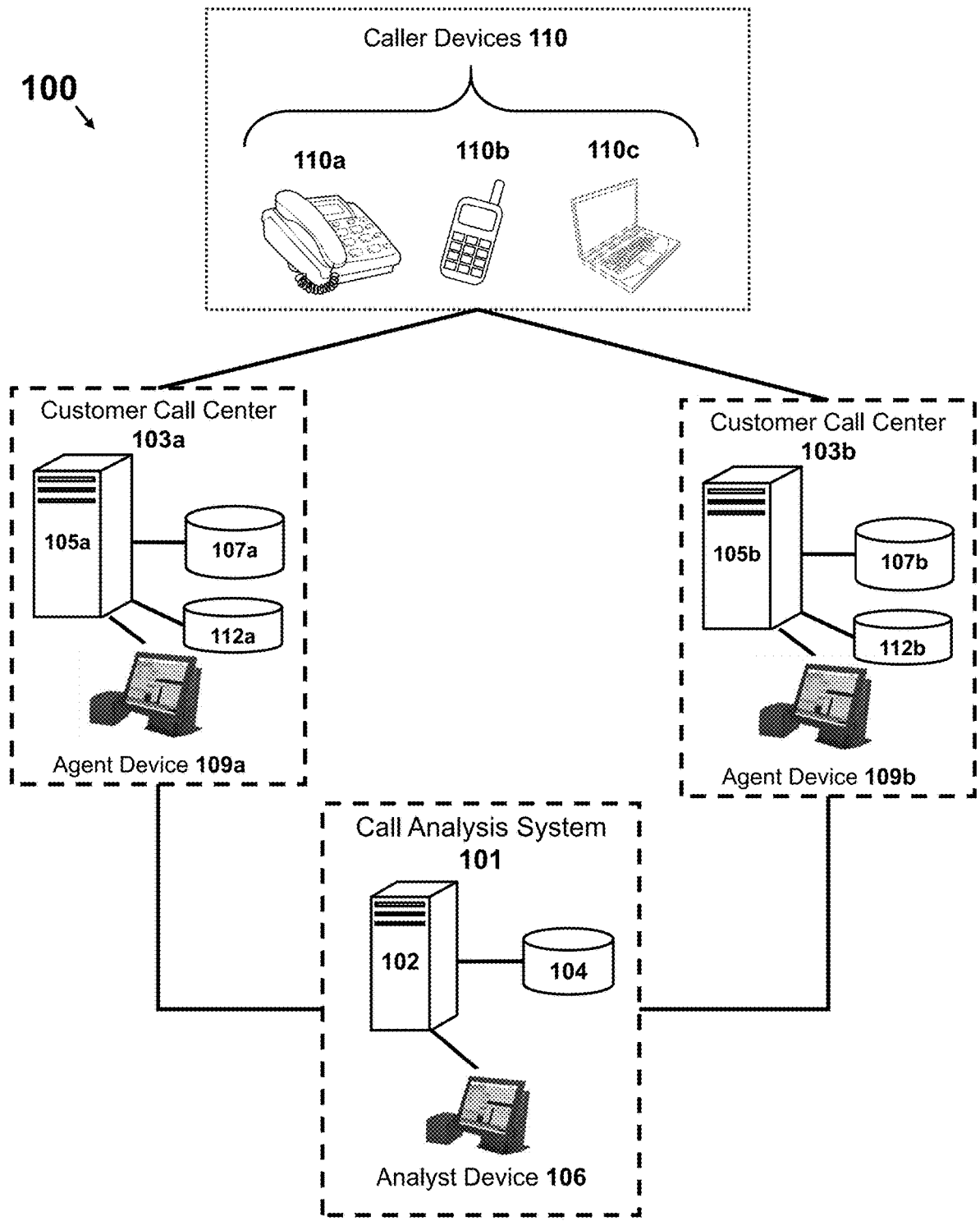
FIG. 1 illustrates a system for detecting spoofed audio signals, according to an embodiment.

Reference will now be made to the illustrative embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to a person skilled in the relevant art and having possession of this disclosure, are to be considered within the scope of the invention.

Embodiments described herein provide for systems and methods for detecting whether an input audio signal is a spoofed audio signal or a genuine audio signal. As mentioned above, ASV systems are still vulnerable to the sophistication spoofing attacks. While some machine learning approaches are effective in detecting spoofed audio signals, such approaches require the designers to make assumptions on the discriminative features to be identified by the machine learning process. In contrast, the embodiments described herein include end-to-end systems that require little or no prior knowledge about the discriminative features. These embodiments employ neural networks for feature extraction. Further, these embodiments employ front ends that preprocess the audio signals before they are fed to the neural networks. The front ends themselves are trainable based on the same audio signals that are used to train the feature extracting neural networks. The end-to-end systems provide improved accuracy in detecting spoofed audio signals.

Components of an Illustrative System

FIG. 1 shows components of a system 100 for receiving and analyzing telephone calls, which includes detecting spoofed audio signals, according to an embodiment. The system 100 may comprise network infrastructures 101, 103a, 103b, including a call analysis system 101 and customer call centers 103a, 103b, as well as any number of caller devices 110. The call analysis system 101 comprises analytics server 102, central database 104, and analyst devices 110. Customer call centers 103a, 103b may comprise external servers 105a, 105b, external databases 107a, 107b, agent devices 109a, 109b, and data capture appliances 112a, 112b. It should be understood that the components of the system 100 are merely illustrative. Other embodiments may include additional or alternative components, or omit components, from the components in the system 100, but are still within the scope of this disclosure. It should be appreciated that FIG. 1 is merely one example of the devices of system 100. Although FIG. 1 only shows system 100 having only a few of the various components, it should be appreciated that other embodiments may comprise, be coupled to (via one or more networks), or otherwise implement any number of devices capable of performing the various features and tasks described herein.

The various components of the call analysis system 101 and call centers 103a, 103b may be interconnected with each other, internal and external to the network infrastructures, via hardware and software components of one or more networks. Examples of a network include, but are not limited to, Local Area Network (LAN), Wireless Local Area Network (WLAN), Metropolitan Area Network (MAN), Wide Area Network (WAN), and the Internet. The communication over the network may be performed in accordance with various communication protocols, such as Transmission Control Protocol and Internet Protocol (TCP/IP), User Datagram Protocol (UDP), and IEEE communication protocols. Likewise, caller devices 110 may communicate with network infrastructures 101, 103a, 103b via telecommunications protocols, hardware, and software capable of hosting, transporting, and exchanging telephony-based audio signals associated with telephone calls.

It should be appreciated that FIG. 1 is merely one example of the devices of system 100. Although FIG. 1 shows system 100 having a few of the various components, configurations may include, may be coupled to (via one or more networks), or may otherwise implement any number of devices capable of performing the various features and tasks described herein. For example, some configurations may incorporate database 104 into analytics server 102, such that these features are integrated within a single device. In a similar example, some embodiments may incorporate an analyst device 106 into analytics server 102, such that a single computing device performs the features and tasks of such devices. Although only three devices are shown for illustrative purposes, the caller devices 110 in FIG. 1 may represent any number of distinct physical devices, which may originate any number of distinct telephone calls to various destinations respectively. Other embodiments may comprise additional or alternative devices, or may omit devices shown in FIG. 1, and that such alternative embodiments still fall within the scope of this disclosure.

The system 100 of FIG. 1 comprises various network infrastructures 101, 103a, 103b. Each network infrastructure 101, 103a, 103b may comprise computing devices that collect call data generated from phone calls between the caller devices 110 and the respective infrastructure 101, 103a, 103b, and store the call data into a machine-readable storage media, such as databases 104, 107a, 107b. Servers 102, 105a, 105b may then access the call data to execute various operations described herein, including, but not limited to: querying or updating a database 104, 107a, 107b; pre-processing or otherwise conditioning the call data; executing various analytics on call data; and exchanging call data with various devices of the system 100 via one or more networks.

Call analysis system 101 may be operated by an entity that offers call analytics services to call centers 103a, 103b, which may owned or operated by customers of the call analytics service or sub-components of a larger organization. The call analysis system 101 may comprise any number computing devices configured to collect from various data sources call data generated from phone calls involving caller devices 110 and store the call data into storage media, such as a central database 104. The devices of the call analysis system 101 may also execute various analytics processes on the call data, such as executing software processes for generating spoof detection classification models and executing software processes for the detecting spoofed calls.

Call analytics system 101 comprises an analytics server 102 that executes various operations described herein, such as, for example, querying or updating a central database 104 that stores the call data, pre-processing or otherwise conditioning the call data, executing various artificial intelligence and machine learning analytics on the call data, and performing certain actions based on the results of those analytics processes. In one configuration, the call analysis system 101 may provide anti-spoofing services to the call centers 103a, 103b. In this example, the call analysis system 101 generates spoof detection classification models that are trained on call data received from the call centers 103a, 103b. In some cases, the call analysis system 101 performs the spoof detection processes using the trained models. In some cases, the call analysis system 101 distributes global or tailored trained models to the call centers 103a, 103a, which in turn perform the spoof detection process themselves.

Call centers 103a, 103b may be owned and operated by customers of a call analysis service or in some cases may be sub-components of a larger organization. Call centers 103a, 103b may have external servers 105a, 105b, external databases 107a, 107b, agent devices 109a, 109b, and data appliances 112a, 112b. Devices of call centers 103a, 103b, such as data appliances 112a, 112b, may be configured to collect call data generated during phone calls between caller devices 110 and the particular call center 103a, 103b. Call data collected at the call centers 103a, 103b may be stored into external database 107a, 107b or external server 105a, 105b, which may transmit the call data to the call analysis system 101 or perform various analytics processes.

Call analysis system 101 comprises analytics server 102, central database 104, and analyst devices 110. Analytics server 102 comprises a spoof detection subsystem configured to receive and analyze call data to train spoof detection classification models and execute spoof detection processes using trained models. Analytics server 102 may be any kind of computing device comprising a processor, memory, and software configuring the analytics server 102 to execute various processes and tasks described herein. Non-limiting examples of the analytics server 102 may include a server computer, a desktop computer, a laptop computer, a tablet computer, a smartphone, and any other type of computing device. The analytics server 102 may be coupled to one or more databases 104 and analyst devices 106 via one or more networks, allowing the analytics server 102 to communicate call data, database queries, and execution instructions (e.g., execution parameters, triggering inputs, query parameters), among other machine-readable computer data and configurations, with other components of the system 100.

The analytics server 102 may execute various processes tasks on the call data accessible to the call analysis system 101. The analytics server 102 may transmit outputted data, such as spoof detection results, trained classification models, and other data updates, to various devices of the system 100, including call centers 103a, 103b. The analytics server 102 or another device of the call analysis system 101 may make the central database 104 available to devices of the call centers 103a, 103b to query and download various types of data; or may publish certain output data to a website, web portal, FTP site, or other externally accessible databank that is accessible to the call centers 103a, 103b. In some implementations, the call analysis system 101 may tailor some or all of the output data and processes to particular call centers 103a, 103b.

The analytics server 102 may receive call data containing an audio signal from phone calls involving caller devices 110, including calls that caller device 110 makes or receives to or from the call center 103a, 103a. The spoof detection subsystem may and extract certain forms of data from such audio signals.

In some embodiments, the analytics server 102 can execute a training process for training one or more spoof detection subsystems, such as, for example, the first spoof detection subsystem 200 and the second spoof detection subsystem 500 discussed below. In particular, the analytics server 102 can train the spoof detection subsystem based on audio signals collected from phone calls involving caller deices 110 or analyst device 106. The analytics server 102 may also store in the database 104 audio signals with known verification statuses such as spoofed audio signals or genuine audio signals. The analytics server 102 can train the spoof detection subsystems using the audio signals with known verification statuses. Examples of such training is discussed below in relation to FIG. 3 and FIG. 6. The analytics server 102 also can execute spoof detection processes for detecting whether an audio signal associated with an ongoing call is a spoofed audio signal or a genuine audio signal. To detect spoofed or genuine audio signals the analytics server 102 can capture the audio signal of an ongoing phone call and provide the audio signal to a trained spoof detection subsystem. The trained spoof detection subsystem (as discussed below) can provide a prediction of whether the audio signal is a spoofed audio signal or a genuine audio signal. The analytics server 102 uses the prediction from the trained spoof detection subsystem to take further action, such as disconnect the call or execute additional authentication processes.

The central database 104 may store, update, manage, and query various types of data accessible to, and for use by, components of the system 100, including call data for phone calls. Database 104 may be hosted on any computing device comprising a processor, memory, and software capable of performing the various tasks and processes described herein. In some implementations, database 104 may be integrated into a single computing device with other components of the system 100, such as analytics server 102. And in some implementations, as illustrated in FIG. 1, database 104 may be hosted by a distinct computing device and may be in communication with analytics server 102 via one or more networks.

The central database 104 may store call data and audio signals related to calls for phones and operational data related to algorithmic classification models. Database 104 may also store output data results generated by the various processes. Non-limiting examples of the data stored in a database may include training audio signals with known verification status of spoofed call audio signal or genuine audio signal and trained parameters of spoof detection subsystems. The verification status of each of the audio signals can be stored as metadata associated with each of the plurality of audio signals. Alternatively, central database 104 can store data structures that identify the verification status of each of the audio signals as being a spoofed audio signal or a genuine audio signal. Central database 104 can include training and testing datasets corresponding to the respective functions to be performed with respect to the one or more neural networks.

As discussed further below in relation to a triplet loss function approach to training the one or more neural networks, the central database 104 can include audio signals that are designated as positive audio signals, negative audio signals, and anchor audio signals. The audio signals designated as positive audio signals and anchor audio signals can have the same verification status, such as, for example, a spoofed audio signal or a genuine audio signal. The negative audio signals, on the other hand, have a verification status that is different from the verification status of the positive audio signals and the anchor audio signals. For example, if the verification status of the positive and the anchor audio signals is "a spoofed audio signal," then the verification status of the negative audio signals would be "a genuine audio signal.

Analyst device 106 may be operated by personnel of the call analysis system 101 (e.g., fraud analysis, administrators) to configure components of the system 100 such as the analytics server 102 and central database 104, to execute various analytics processes, generate data outputs, and manage various types of data. Analyst device 106 and agent devices 109a, 109b may be any computing device comprising memory, a processor, and software, and configured for various features and tasks described herein. Non-limiting examples may include a server computer, laptop computer, desktop computer, a tablet computer, and the like.

Analyst device 106 may be coupled via one or more networks to analytics server 102 and central databases 104, allowing analyst devices 106 to communicate instructions (e.g., database queries, modeling instructions) to analytics server 102, central databases 104, or other devices of the call analysis system 101. The analyst device 106 may transmit instructions and configuration parameters to analytics server 102 for executing certain processes and to central databases 104 for accessing (e.g., querying, updating) or otherwise managing call data for the system 100.

Agent devices 109a, 109b may be coupled via one or more networks to external servers 105a, 105b and external databases 105a, 105b, allowing agent devices 109a, 109b to communicate instructions (e.g., database queries, modeling instructions) to the analytics server 102 of the call analysis system 101 (e.g., via a web portal GUI) or to external servers 105a, 105b within the same call center 103a, 103b. The agent devices 109a, 109b may transmit instructions and configuration parameters to analytics server 102 or external servers 105a, 105b for executing training and/or classification processes and to external databases 105a, 105b for accessing (e.g., querying, updating) call data stored within the corresponding call center 103a, 103b.

In some embodiments, the analyst device can configure the system 100 such that the spoof detection subsystems discussed herein can be executed in any one of the customer call centers 103a, 103b, the caller devices 110, or the call analysis system. In some embodiments, the analyst device 106 can configure the system such that the training of the spoof detection system is carried out at one location in the system 101 (e.g., at the analysis server 102) and the detection of spoofed audio signals in incoming audio calls is carried out at another location in the system 100 (e.g., at the caller device 110, the customer call centers 103a, 103b). In some embodiments, the analyst device 106 can receive requests from one or more components of the system 100 (e.g., the customer call center 103a, 103b) for trained detection models of the spoof detection subsystems. The analyst device 106 can in response transmit a trained spoof detection subsystem to the requesting component or transmit values of configuration parameters of the spoof detection subsystem to the requesting component to allow the requesting component to configure a local spoof detection system with the received configuration parameters.

Customer call centers 103a, 103b may comprise external servers 105a, 105b, external databases 107a, 107b, agent devices 109a, 109b, and data capture appliances 112a, 112b.

The external server 105a, 105b can execute the spoof detection subsystems discussed herein in a manner similar to that discussed above in relation to the analytics server 102. For example, the external server 105a, 105b can carry out training of the spoof detection subsystem based on audio data stored in the external database 107a, 107b. Further, the external server 105a, 105b can carry out spoof detection by executing the spoof detection subsystem for incoming calls at the customer call center 103a, 103b. In some embodiments, as discussed above, the external server 105a, 105b can request configuration parameters of a spoof detection subsystem from the analytics server 102 or the analyst device 106. In some embodiments, the external server 105a, 105b can reconfigure or retrain the locally run spoof detection subsystem based on audio signals stored in the external database 107a, 107b.

The external database 107a, 107b can store audio signals, or configuration parameters of the spoof detection subsystems in a manner similar to that discussed above in relation to the database 104 of the call analysis system. For example, data stored by external databases 107a, 107b may include, without limitation, the audio signals generated from telephone calls received from caller devices 110, metadata associated with audio signals received via carrier networks and/or inputted by users (via an agent device 109a, 109b), and trained spoof detection models received from a call analysis system 101, among other forms of data.

The agent device 109a, 109b may execute an end application that may identify a caller and determine whether the call is a spoofed call. The end application may execute trained classification models that are stored in the external database 107a, 107b or stored locally on the agent device 109a, 109b.

In some embodiments, customer call center 103a, 103b may be equipped with the database capture appliance 112a, 112b. The data capture appliance 112a, 112b may receive, convert, and store audio signals, among other types of call data, received during telephone calls between the caller device 110 and the call center 103a, 103b.

Caller devices 110 may be any communications or computing device that callers can use to place a telephone call to a destination employing various processes and tasks described herein. Non-limiting examples of caller devices 110 may include mobile phones 110a or landline phones 110b. Caller devices 110 are not limited to telecommunications-oriented devices (e.g., telephones), but may also include devices implementing voice-over-IP (VoIP) protocols for telecommunications, such as computers 110c. A user or speaker may speak an utterance into a caller device 110 comprising a microphone and/or software (e.g., codec) for converting the uttered sound into an electrical audio signal. The caller device 110 may be a device capable of telecommunications, such as a telephone (e.g., cellular phone, landline phone) or other processor-based device capable of voice over internet (VoIP) communications (e.g., computer). The caller device 110 then transmits the audio signal according to one or more telephony protocols and networks to establish a telephone call with an agent of customer call center 103a, 103b.

The user's utterance, which is used to perform spoof detection, is received as an audio signal (sometimes referred to as the "recognition audio signal"). The recognition audio signal may be electrically transmitted from the caller device 110 to server 102, 105a, 105b executing a spoof detection subsystem. Although it is contemplated that the caller device 110 into which the recognition speech sample is spoken may be a telecommunication device (e.g., phone), this need not be the case. For instance, the caller device 110 may simply be a microphone located in close proximity to the server 102, 105a, 105b executing a spoof detection subsystem.

The results of the spoof detection analysis can be used by an end application of agent device 109a, 109b or analyst device 106 that needs to verify that the audio signal associated with a caller is a spoofed audio signal or a genuine audio signal. However, even though the implementations of the processes described herein can be used by applications designed to filter out malicious callers, the implementations are not limited to those types of applications. For instance, the processes described herein can be advantageously used in other applications, such as those where voice biometrics are used to authenticate and grant access to a computing resource or achieve physical entry.

It should be noted that various modifications can be made to the system illustrated in FIG. 1. For instance, the caller device 110 may transmit the recognition audio signal directly to an end application, which in turn relays the recognition audio signal to a server 102, 105a, 105b comprising a spoof detection subsystem. In this case, the end application may also receive some form of input from the user representing a self-identification. For instance, in case of performing a speaker identification task, the end application may request the user to identify him or herself (either audibly or by other forms of input) and send both the recognition audio signal and the user's purported identity to the spoof detection subsystem for authentication. Furthermore, there is no limitation in regard to the respective locations of the various elements illustrated in FIG. 1. In certain situations, the end application may be remote from the user, thus requiring the use of telecommunications for the user to interact with the end application. Alternatively, the user (and the caller device 110) may be in close proximity to the end application at the time of use; for example, if the application controls a voice-activated security gate.

Spoof Detection Subsystem Implementing PCEN-Net

Figure 2A:
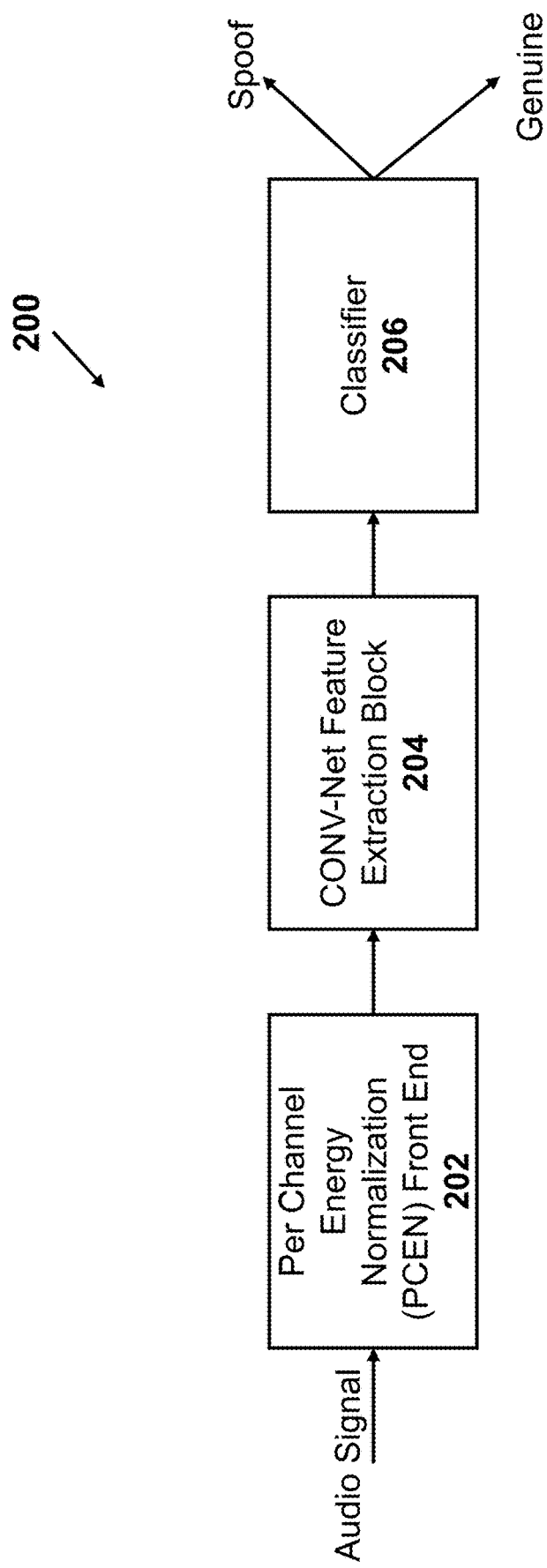
FIG. 2A illustrates a block diagram of a first example spoof detection subsystem, according to an embodiment.
Figure 2B:
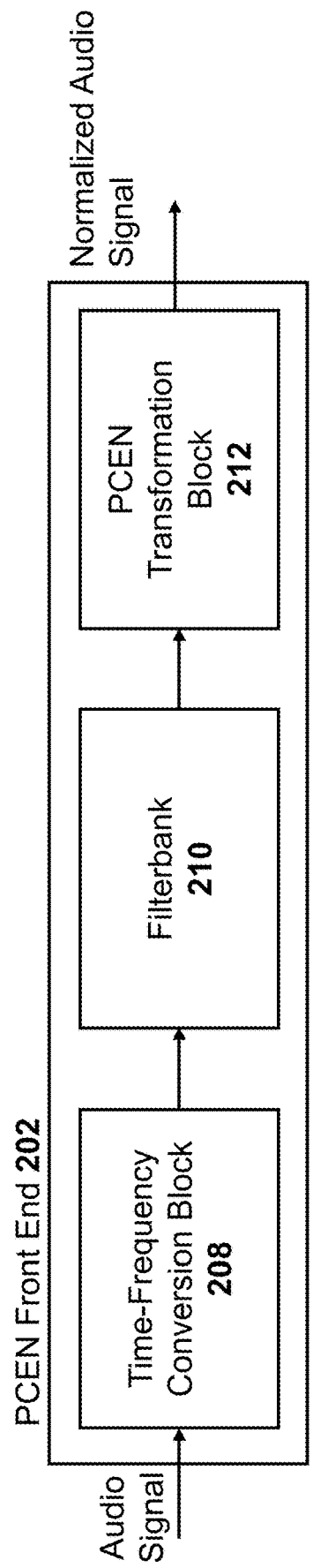
FIG. 2B illustrates a block diagram of an example per-channel energy normalization (PCEN) front end of the first example spoof detection subsystem in the embodiment shown in FIG. 2A.

FIGS. 2A and 2B show components of a first spoof detection subsystem 200 installed and executed by a computing device (e.g., server computer) of a call analysis system, call center, or other network infrastructure. The first spoof detection subsystem 200 comprises hardware and/or software components that may be installed on any number of computing devices and is configured to execute various spoof detection processes and tasks described herein. It should be appreciated that each block represents any number of computing components (e.g., hardware and/or software) of the first spoof detection subsystem 200 that may be utilized to execute the various features and functions described by the blocks. It should be further appreciated that some embodiments may comprise additional or alternative components and still fall within the scope of this disclosure.

FIG. 2A shows a block diagram of the first spoof detection subsystem 200 that includes a per-channel energy normalization (PCEN) frontend 202, a cony-net feature extraction block 204, and a classifier 206. In operation, the first spoof detection subsystem 200 receives one or more audio signals as an input, which may be in any number of machine-readable data formats (e.g., .wav, .mp3). The PCEN frontend 202 processes an audio signal input and generates a per-channel energy transformed audio signal, as illustrated in FIG. 2B, for example. The per-channel energy transformed audio signal is processed by the cony-net feature extraction block 204, which determines a prediction score based on a set of parameters of a convolution neural network (CNN) executed by the cony-net feature extraction block 204. The classifier 206 can compare the prediction score to a threshold value to determine whether the audio signal is a spoofed audio signal or a genuine audio signal. The first spoof detection subsystem 200 is an end-to-end system, in that the first subsystem 200 determines the values of various parameters of the PCEN frontend 202 and the coy-net feature extraction block 204 based on input data. Such input data can include a plurality of audio signals that can be used to train and optimize the first subsystem 200.

FIG. 2B shows a block diagram of PCEN frontend 202 of the first spoof detection subsystem 200 shown in FIG. 2A, according to an embodiment. The PCEN frontend 202 includes a time-frequency conversion block 208, a filterbank 210, and a PCEN transformation block 212. The audio signal received by the time frequency conversion block 208 is in time domain. For example, the audio signal can be represented by a one dimensional array where each position in the array corresponds to a time unit, and each numerical entry represents a magnitude of the audio signal at the corresponding time unit. The time-frequency conversion block 208 transforms the time domain audio signal into a two dimensional time-frequency representation. For example, the time-frequency conversion block 208 can implement discrete Fourier transform to transform the one dimensional array corresponding to the time domain audio signal into a two dimensional matrix representing a combined time and frequency domain representation of the audio signal.

In some embodiments, the time-frequency conversion block 208 can execute a one dimensional CNN for transforming the audio signal from time domain (one dimension) to time-frequency (two dimensions) representations. For instance, when a one dimensional signal is convolved using multiple convolutional one dimensional filters, an output gets an additional dimension (sometimes referred to as "channels") that is equal to the number of filters. As an example, if a one-dimensional input signal has a dimension of 200, and the number of filters is 80, the resulting output size is 200×80. The one dimensional CNN can have an input layer, a plurality of hidden layers, a dense layer, and an output layer. The one dimensional CNN may also have a set of one dimensional CNN parameters that include, for example, the number of hidden layers, the kernel size, the weights at each layer, and bias values, among others. The one dimensional CNN accepts as input the one dimensional array representing the time domain audio signal. The input layer, and the plurality of hidden layers can utilize one dimensional kernels and feature maps to process data. As discussed further below, the one dimensional CNN can be trained using a plurality of audio signals (stored in machine-readable storage media of a computing device), to determine the values of the set of one dimensional CNN parameters.

The filterbank 210 of the PCEN front end 202 comprises software routines and processes that operate as a set of filters that filter the time-frequency representation of the audio signal into a plurality of channels in the frequency domain. The filterbank 210 can determine the number of the plurality of channels and the width of each channel. In some embodiments, the filterbank 210 can be implemented as a trainable linear transformation function that is positioned at an output of the one dimensional CNN discussed above.

The PCEN transformation block 212 transforms the filtered time-frequency representation of the audio signal output by the filterbank 210 into a per-channel energy normalized signal (PCEN) audio signal. The PCEN transformation block 212 uses a transformation function that generates the PCEN audio signal based on the filtered time-frequency representation of the audio signal and a time integration function. The transformation function carries out three component operations on the filtered time-frequency representation of the audio signal: temporal integration, adaptive gain control (AGC), and dynamic range compensation (DRC). The DRC operation can reduce the variance of foreground loudness in the audio signal, while the AGC operation can suppress stationary background noise. The temporal integration can combine audio information over time to improve detection and discrimination of audio artifacts in the audio signal. Beneficially, the transformation of the audio signal into a PCEN audio signal before providing the audio signals to the cony-net feature extraction block 204 improves the ability of the cony-net feature extraction block 204 to extract features that distinguish between spoofed audio signals and genuine audio signals. The transformation function executed by the PCEN transformation block 210 can include several parameters that can be trained using the plurality of audio signals, and can be optimized based on the plurality of audio signals.

In some embodiments, the time integration function can be implemented using a one time-step recurrent neural network (RNN). The RNN can perform the same task for every element of an input sequence, with the output being dependent on the previous computations, which is well suited for implementing an integration function. The input sequence can be a time domain sequence of audio samples corresponding to an audio signal. The RNN can perform the tasks on the input sequence in a moving window fashion, where the processing at a given window position in the input sequence is based on the portion of the input sequence within the window and the result of processing one or more previous positions of the window. The parameters of the RNN can be optimized based on the plurality of input audio signals.

The first spoof detection subsystem 200 can parse (sometimes referred to as "slice") the PCEN audio signals into subframes, where each subframe represents a duration of time. As an example, the PCEN front end 202 can parse the PCEN audio signals into subframes and provide the subframes to the feature extraction block 204. In some embodiments, the feature extraction block can include an input layer that parses the PCEN audio signals into subframes. Referring back to FIG. 2A, each of the subframes can form an input to the cony-net feature extraction block 204. For example, the first spoof detection subsystem 200 can slice the PCEN audio signal into subframes of about 200 ms. In some embodiments, the number of subframes can be equal to the number of inputs of the feature extraction block 204. For example, the subframe duration can be equal to the duration of the audio signals in the time domain divided by the number of inputs of the feature extraction block 204. In some examples, a subframe can overlap in time with at least other adjacent subframe.

The feature extraction block 204, as mentioned above, can be a CNN which receives as inputs the various subframes of the PCEN audio signal. The CNN can be a standard CNN including an input layer, a plurality of convolution layers and a fully connected output layer. The output of the CNN can have a set of parameters that define the number of kernels, the size of the kernels, the weights of each layer, and the bias values. The CNN also can include pooling layers between two convolution layers that can pool the feature maps of previous convolution layers. The pooling layers can include, for example, max pooling layer, average pooling layer, etc. The output layer of the CNN can generate a prediction score, which indicates the likelihood that an audio signal is a spoofed audio signal or a genuine audio signal. In a non-limiting example, the CNN can include three hidden layers interleaved with max-pooling layers of size 4×2, with a stride of 2×1 and non-linear activation. In another non-limiting example, the three hidden convolution layers (first, second, and third) can include 16, 32, and 64 kernels respectively; the kernels in the first hidden convolution layer can have a height and width of 20 and 8, respectively; the kernels in the second hidden convolution layer can have a height and width of 10 and 4, respectively, and the third hidden convolution layer can have a height and width of 5 and 2, respectively.

The classifier 206 can compare the prediction score generated by the CNN to a threshold value to determine whether the predicted verification status of the audio signal is a spoofed audio signal or a genuine audio signal. As an example, the classifier can assign a value '0' to a verification status of spoofed audio signal and a value '1' to the verification status of genuine audio signal. The classifier 206 also can set a threshold value of for example 0.5. If the prediction score is greater than 0.5, the classifier 206 can determine that the predicted verification status of the audio signal is a genuine audio signal. On the other hand, if the prediction score is less than 0.5, the classifier can determine that the predicted verification status of the audio signal is spoofed audio signal. Additionally or alternatively, in some embodiments, the classifier 206 can be a support-vector machine (SVM). For example, in some instances, an output vector of the CNN can be generated based on the pooling layer immediately preceding the fully connected layer of the CNN. The output vector can be provided to the SVM for a binary classification into a spoofed audio signal or a genuine audio signal.

The ability of the spoof detection subsystem 200 to predict the verification status of the audio signals is based in part on the values of the parameters selected for the PCEN frontend 202 and the feature extraction block 204.

Figure 3:
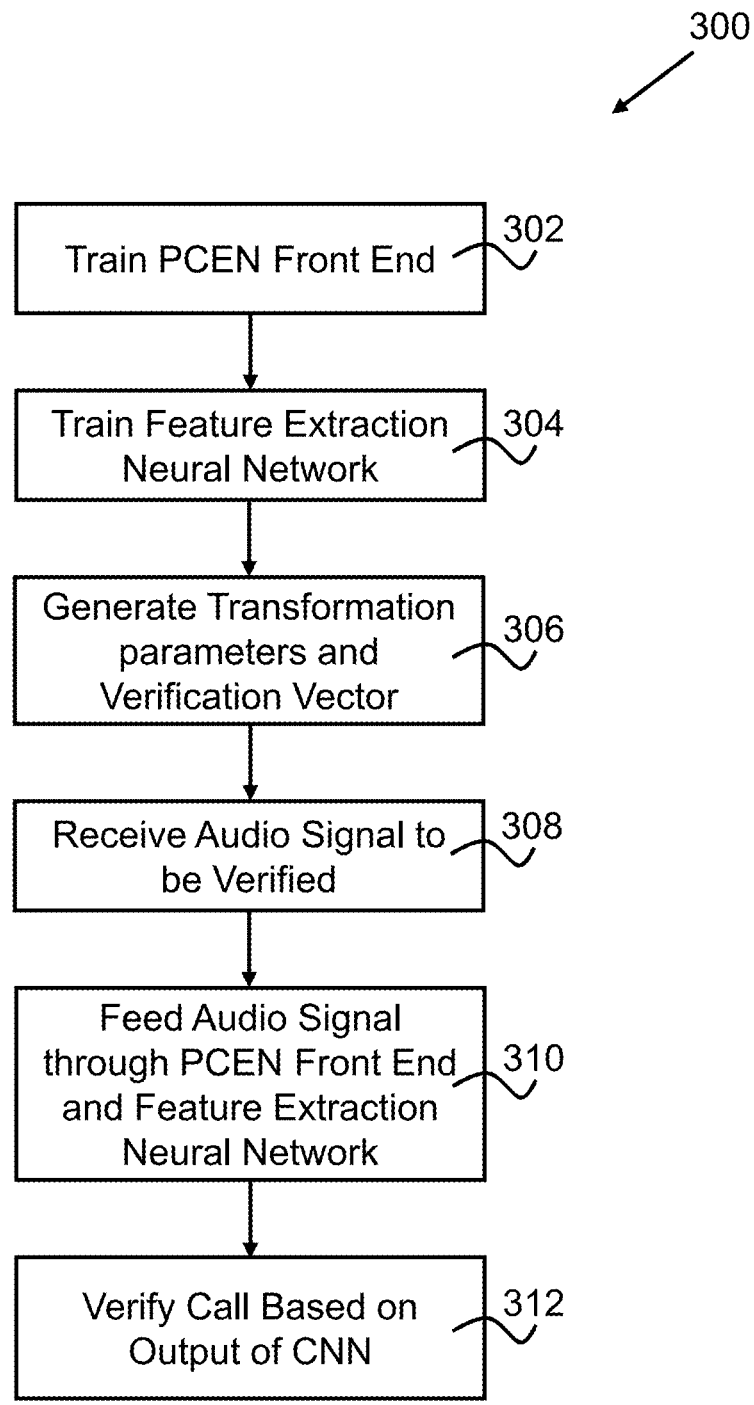
FIG. 3 illustrates a flowchart showing execution steps of a first example spoof detection process, according to an embodiment.

FIG. 3 depicts a flowchart showing execution steps of a spoof detection process 300, according to an embodiment. The spoof detection process 300 includes training the various parameters of the spoof detection system and detecting the verification status of an audio signal fed to the trained spoof detection system. As the spoof detection subsystem is an end-to-end system, the same audio signals are used to train both the PCEN frontend and the feature extraction block, as well as a classification backend. It should be understood that the steps shown and described herein are merely illustrative and additional, alternative, and fewer number of steps should be considered to be within the scope of the disclosure.

In step 302, the process 300 includes training the PCEN front end. As discussed above, the PCEN frontend includes a time-frequency conversion block, the filter bank and the PCEN transformation block. Each one of these blocks can include trainable parameters, the values of which can be optimized based on the training on a plurality of audio signals. The time-frequency conversion block can be implemented as a one-dimensional CNN having one-dimensional CNN parameters. Further, the filterbank can include trainable parameters that can determine the number and bandwidth of the frequency channels in the filterbank. Furthermore, the PCEN transformation block includes per-channel transformation neural network parameters that can include the parameter of the transformation function and the parameters of the RNN implementing the time integration function.

The training process can begin with feeding the PCEN front end with a plurality of audio signals, where each of the plurality of audio signals has a verification status of spoofed audio signal or genuine audio signal. The PCEN front end modifies each of the plurality of audio signal to generate corresponding PCEN audio signals. The PCEN front end can receive a backpropagated loss function determined by the feature extraction block (discussed in further detail below). The PCEN front end can utilize the backpropagated loss function to modify the trainable parameters of the PCEN frontend such that the magnitude of the loss function is minimized.

In a next step 304, the process 300 includes training the feature extraction neural network. The feature extraction block, as discussed above, can be implemented with a CNN. The CNN can be trained with the PCEN audio signals output by the PCEN frontend. In particular, each of the plurality of PCEN audio signals output by the PCEN frontend can be fed to the CNN of the feature extraction block to determine the loss function. In some embodiments, the process 300 can utilize a triplet loss approach for training the CNN, as discussed below. It should be understood that the triplet loss approach is only an example, and that other approaches for training the spoof detection system can be utilized.

Figure 4:
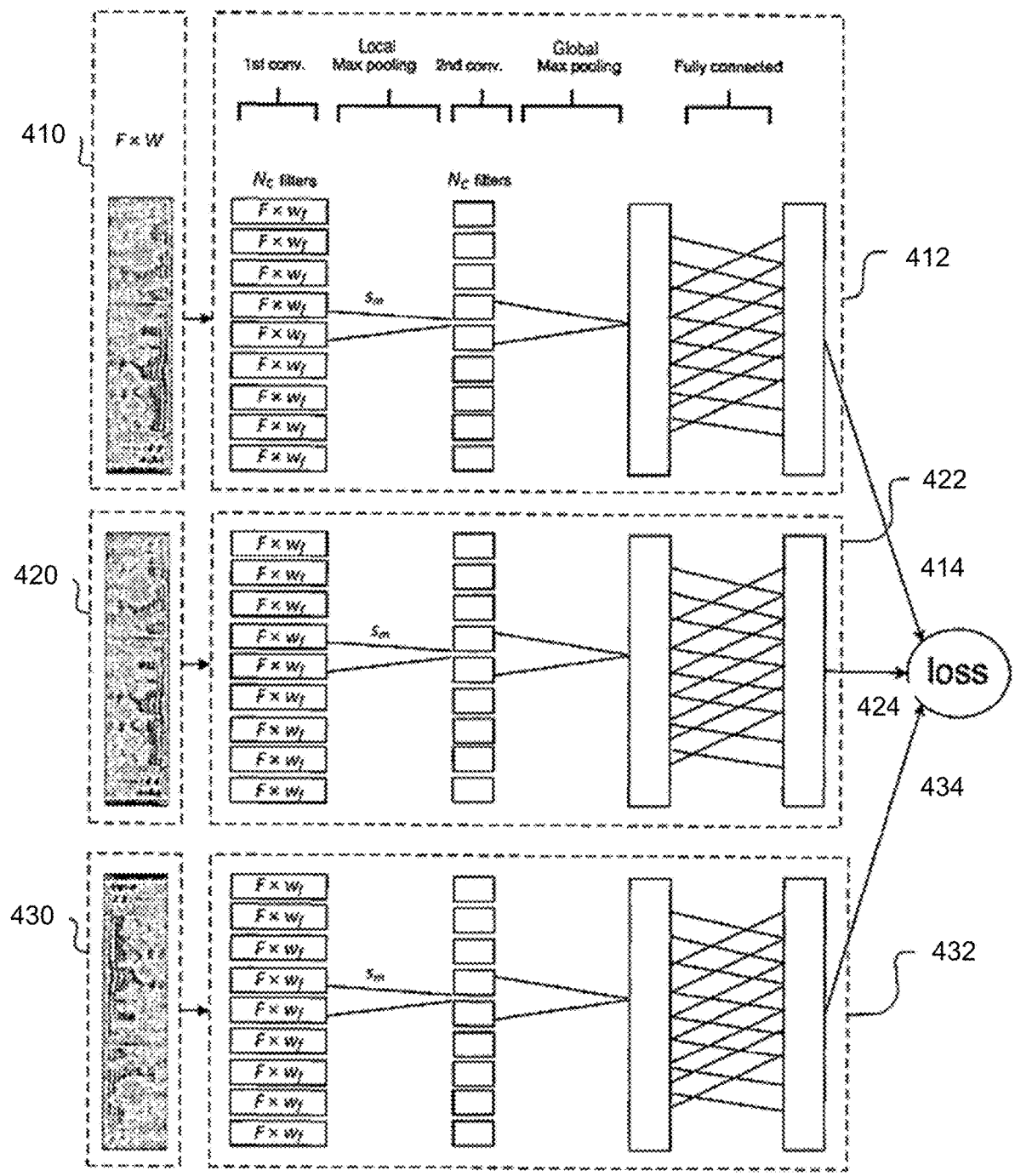
FIG. 4 illustrates an example of the structure of a neural network with a triplet network architecture for use in training, according to an embodiment.

FIG. 4 illustrates a specific example of the structure of a neural network with a triplet network architecture for use in training the feature extraction block and the PCEN frontend. Each of a first, second, and third feed-forward neural networks 412, 422, 432 may comprise a first convolutional layer connected to a max-pooling layer, a second convolutional layer followed by a second max pooling layer, a subsequent fully connected layer, and an output layer which comprises the embedding vector. Upon conclusion of training, however, the output layer of each of the feedforward neural networks 412, 422, 432 will be configured to produce a feature representation (e.g., a vector representation of the audio signal).

Also shown in FIG. 4 are the respective inputs 410, 420, 430 of the first, second, and third feed-forward neural networks 412, 422, 432. According to some embodiments, prior to being inputted into a respective one of the feed-forward neural networks 412, 422, 432, each of the audio signals can be preprocessed by the PCEN frontend to generate a two-dimensional representation (or "image") of the audio signal. Also, as mentioned above, the PCEN audio signals can be sliced into a certain number of overlapping subframes or windows (W).

In a specific example of such pre-processing, which is not to be construed as limiting, an image may be generated for each audio signal by partitioning the underlying audio signal into windows of a 20 ms duration, with an overlap (or window shift) of 10 ms. Further, the image for each audio signal may include, e.g., five-hundred of the aforementioned overlapping windows (W=500), with 40 Mel filterbank features (F=40) being extracted from each window (thereby resulting in an image of a size 40×500 in each of the inputs 410, 420, 430). In this example, this would correspond to an audio signal with a duration of 5 seconds (with the 40-dimensional feature vector being extracted every 10 ms). It should be appreciate that this is merely an example, and it should be noted that different audio signal durations, different numbers of windows, and different numbers and types of features may be used. For instance, different types of "images" may be applied to the CNN.

The images can be representations of the plurality of audio signals including a set of positive audio samples, a set of negative audio samples, and a set of anchor audio samples. The set of positive audio samples and the set of anchor audio samples have the same verification status. In particular, the images corresponding to the set of positive audio signals can be provided to the first neural network 412, the images corresponding to the set of anchor audio signals can be provided to the second neural network 422, and the images corresponding to the set of negative audio samples can be provided to the third neural network 432.

It should be noted that the aforementioned preprocessing may be performed either before or after relevant audio signals are stored in the memory device, which may be volatile or non-volatile storage (e.g., memory, RAM, disk). It is also contemplated that the caller device inputting audio signals, and other types of speech transmitting/recording devices that are used for inputting the positive and negative speech samples (e.g., agent devices, analyst device), may be configured to perform some or all of the operations of the aforementioned preprocessing.

Assuming that input signal is a preprocessed "image" of a size F×W as described above, a first convolutional layer of each of the first, second, and third feed-forward neural networks may comprise an appropriate number (Nc) of convolutional filters to process such an image. Further, each convolutional filter in this layer may be configured to process the features of a corresponding window, and thus have a size of F×W1 neural units (or "neurons"). As such, each convolutional filter would have a height commensurate with the number of features F, and a width (W1) that can be chosen based on various considerations, such as accounting for dynamics of speech and satisfying processing and memory requirements, among others.

In a specific non-limiting example of the configuration of the first convolutional layer in the feed-forward neural networks 412, 422, 432 of FIG. 4, the inputted "image" is preprocessed with a size (F×W) of 40×500 as mentioned above in connection with the previous non-limiting example regarding preprocessing, corresponding to 5 seconds of audio signal, with a 40-dimensional feature vector extracted every 10 ms. In this case, the first convolutional layer of each of the first, second, and third feed-forward neural networks may comprise two-hundred, fifty-six convolutional filters (Nc=256), each filter having a height of 40 neurons (corresponding to the 40 features extracted from each window), and a width (Wf) not exceeding 5 neurons (e.g., 1 or 3 neurons). In this case, the depth of the first convolutional layer in FIG. 4 would be 256, the height of this layer would be 40, and the width of the layer would be wf≤5. Also, in this non-limiting example, the entry neurons in the first convolutional layer could be connected to multiple windows of the input image.

It should be noted that the above is a non-limiting example, and that the depth and height dimensions of the first convolutional layer may differ from the aforementioned 256 and 40, respectively. In this case, however, it is suggested that the depth (i.e., the number of convolutional filters Nc) would preferably be less than or equal to the number of overlapping windows in the inputted image, while the height would preferably be equal to the number of features (e.g., Mel filterbank features) extracted from each of the windows during preprocessing of the relevant speech sample.

Subsequent to the first convolutional layer in each of the feed-forward neural networks 412, 422, 432, a one-dimensional max-pooling layer of a size (Sm) is provided. A max-pooling layer is a layer that computes a maximum value from a temporally input sequence. The results of the max-pooling layer are provided to a second convolutional layer, comprised of Nc convolutional filters. However, the size of these filters is not necessarily the same as those in the first convolutional layer. In a non-limiting example, the height and width of this second convolutional layer may be 1.

Furthermore, a final global max-pooling layer is applied across the entire time axis, to make the resulting embedding vector less sensitive to the duration of the inputted image. In some embodiments, each neural network can determine a mean and a standard deviation of the last max-pooling layer. The determined mean and standard deviation values can be concatenated to form a L2 normalized vector. The next layers are a fully connected layer and output layer; for example, connected with each of the Nc neurons. The output layer provides the embedding vector during training. Specifically, the output layers of the respective first, second, and third feed-forward neural networks 412, 422, 432 are what were previously referred to as the first, second, and third networks outputs 414, 424, 434 of the CNN.

For example, during training, when the image of an positive audio signal is fed through the first feed-forward neural network 412, the first network output 414 produces a result which may be symbolized as EVx+, which stands for the embedded vector for the positive audio signal. Similarly, when the image of an anchor speech sample is fed through the second feed-forward neural network 422, the second network output 424 produces a result which may be symbolized as EVxa, which stands for the embedded vector for the anchor audio signal. Similarly, when the image of a negative speech sample is fed through the third feed-forward neural network 432, the third network output 434 produces a result which may be symbolized as EVx−, which stands for the embedded vector for the negative audio signal.

After a given batch of training samples are processed, a loss function may be calculated based on the respective outputs 414, 424, 434 of the first, second, and third feed-forward neural networks 412, 422, 432. The computed loss function may be used to train the respective neural networks 412, 422, 432 of the feature extraction block and the PCEN frontend using a backpropagation algorithm with a "stochastic gradient descent" optimizer, which aims at computing the gradient of the loss function with respect to all the weights in the respective neural networks (the PCEN frontend neural networks and the feature extraction block neural network). The goal of the optimizer is to update the weights, in order to minimize the loss function. However, it is also contemplated that other types of backpropagation algorithms may be used. In the example of FIG. 4, the loss function can be used to update the connection weights in each of the first convolutional layer, the second convolutional layer, and the fully connected layer.

Referring again to the process 300 in FIG. 3, after the training of the PCEN frontend 302 and the training of the feature extraction neural network 304, the process 300 proceeds to a next step 306, to generate transformation parameters for the PCEN frontend and the feature extraction block, and a verification vector.

After the PCEN frontend and the feature extraction block training is completed, the process 300 can proceed to a next step 308 of receiving an audio signal that is to be verified as being a spoof audio signal or a genuine audio signal. The received audio signal is processed through the PCEN frontend and the feature extraction neural network, as discussed above 310. The PCEN frontend generates a PCEN transformed audio signal based on the trained parameters of each of the time-frequency conversion block, the filterbank, and the PCEN transformation block. The output of the feature extraction block is then fed to a classifier to determine whether the audio signal is a spoof audio signal or a genuine audio signal 312. In some embodiments, the feature extraction neural network can generate a prediction score. The classifier can compare the prediction score to a threshold value to predict the verification status of the audio signal.

Spoof Detection Subsystem Implementing SincResNet

Figure 5A:
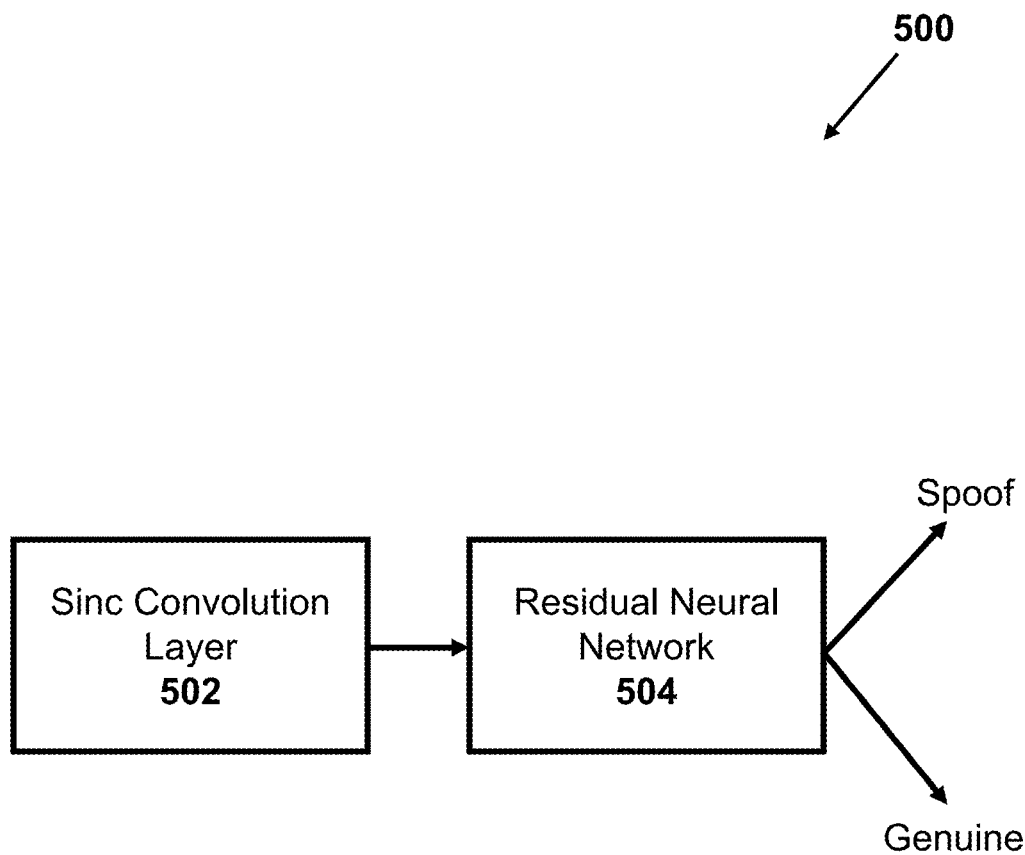
FIG. 5A illustrates a second example spoof detection subsystem, according to an embodiment.

FIG. 5A illustrates a second spoof detection subsystem 500. The second spoof detection subsystem 500 can be implemented as an alternative to a PCEN-Net spoof detection subsystem, such as the spoof detection subsystem shown in FIG. 1. Similar to the embodiments discussed above, the second spoof detection subsystem 500 is also an end-to-end detection system. However, the second spoof detection subsystem 500 is based on a residual neural network and preprocessing the audio signal using sinc filters before providing the signals to the residual neural network.

The second spoof detection subsystem 500 includes a sinc convolution layer 502 and a residual neural network 504. In operation, the sinc convolution layer 502 receives as an input an audio signal and outputs a two dimensional matrix. In some embodiments, the input audio signal can be an audio signal for which a verification status (spoofed audio signal or genuine audio signal) is to be determined. In some embodiments, during training of the second spoof detection subsystem 500, the audio signal can be one of a plurality of audio signals with known verification status. The sinc convolution layer 502 can be implemented as a filter bank of rectangular bandpass filters. Each of the rectangular bandpass filters can have a two cut-off frequencies (low and high) defining the boundaries of the frequency band. The low and high cut-off frequencies of each bandpass filter can be trained based on a plurality of audio signals, and is discussed below in relation to FIG. 5A.

The sinc convolution layer 502 can generate the two-dimensional matrix based on the audio signal and the parameters of bandpass filters of the filter bank. In some embodiments, the first dimension of the two dimensional matrix can correspond to the number of frequency bands in the filter bank, while the second dimension of the two dimensional matrix can be a function of the time duration of the audio signal and a window size of the convolution. As a non-limiting example, the sinc convolution layer can generate a two dimensional matrix of size 128×200 for a two-second audio signal. Utilizing the sinc convolution layer for preprocessing the audio signal can result in reduced number of parameters as compared to a similar convolution layer of a CNN. The reduced number of parameters, in turn, result in reduced time in converging to values for the parameters during training.

Figure 5B:
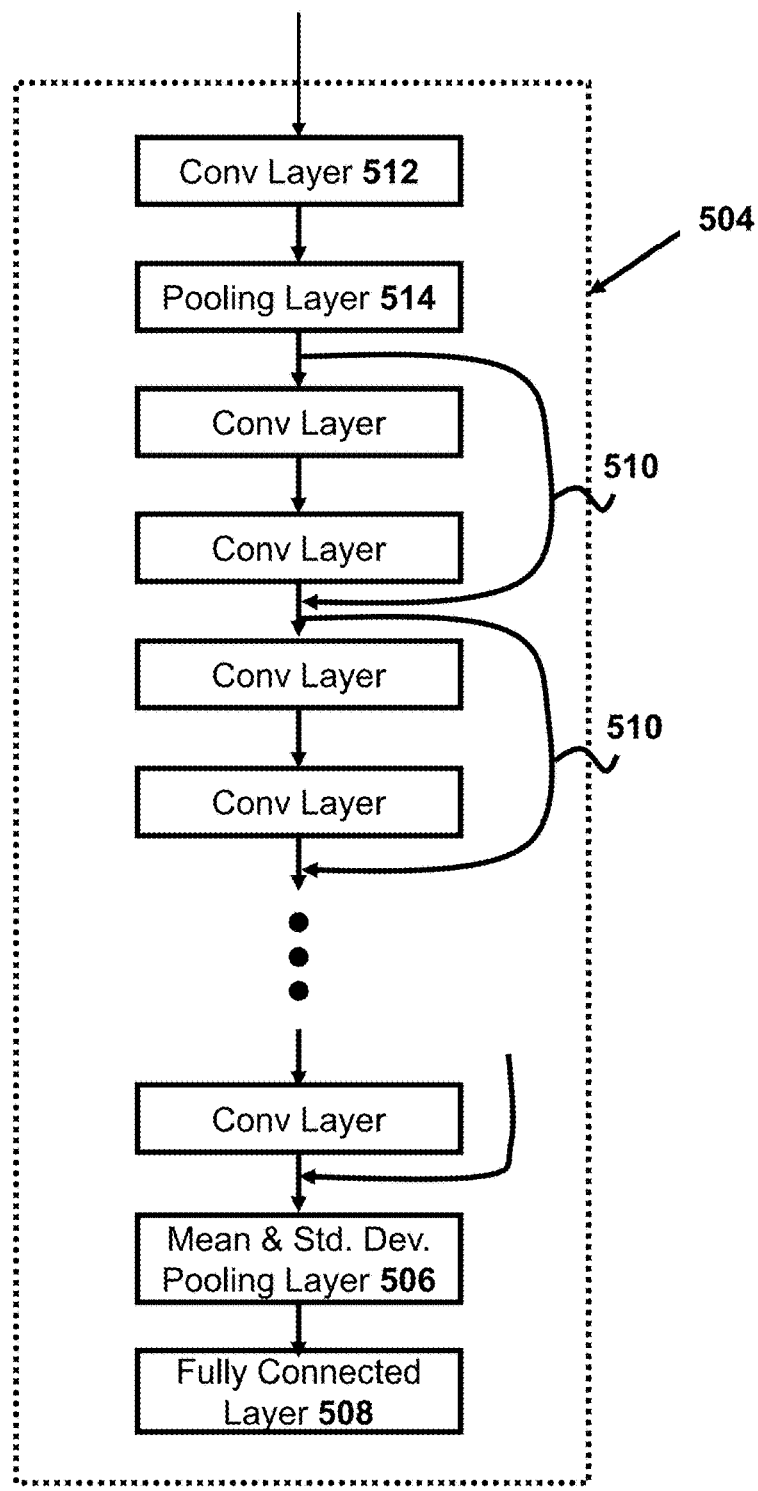
FIG. 5B illustrates a block diagram of a residual neural network (RNN) of the second example spoof detection subsystem in the embodiment shown in FIG. 5A.

The residual neural network (RNN) 504 is used for feature extraction from the two dimensional matrices representing the plurality of audio signals preprocessed by the sinc convolution layer 502. FIG. 5B shows an example block diagram of the RNN 504 shown in FIG. 5A. The RNN includes a plurality of convolution layers 512 and residual connections 510 between an output of a convolution block and an input of a subsequent convolution block. The RNN 504 includes a mean and standard deviation pooling layer 506 positioned between the last convolution layer and the fully connected layer 508. The mean and standard deviation pooling layer is a global pooling layer that pools the means and the standard deviations of the feature maps. In some embodiments, the RNN can include two fully connected layers 508, where each of the two fully-connected layers 508 include rectified linear activation. In some embodiments, the RNN 504 can further include a length normalization layer positioned after the fully-connected layers 508. The length normalization layer can generate a length normalized output based on parameters of the length normalization layer and the output of at least one of the two fully connected layers 508. In some embodiments, any one of ResNet-18, ResNet-34, or ResNet-56 can be used to implement the RNN 504. However, these ResNets are modified to remove the global average pooling layer and are replaced with mean and standard deviation pooling layers (sometimes referred to as "statistics layers"). The output of the mean and standard deviation pooling layers can be fed to the two fully-connected layers.

Figure 6:
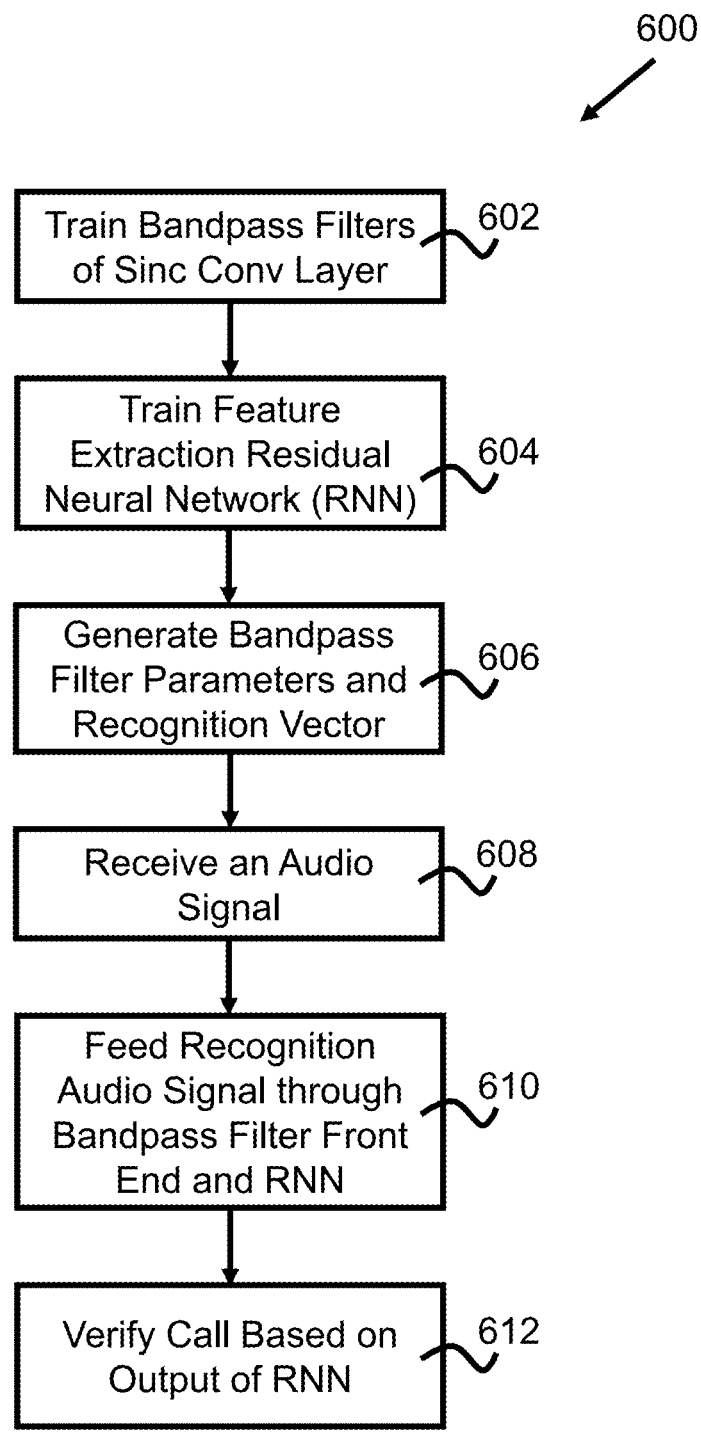
FIG. 6 illustrates a flowchart showing execution steps of an example spoof detection process, according to an embodiment.

FIG. 6 depicts a flowchart showing execution steps of a second example spoof detection process 600. The second example spoof detection process 600 may correspond for illustrative purposes to a second spoof detection subsystem 500 shown in FIG. 5A. The process 600 includes training the various parameters of the second spoof detection system. As the second spoof detection subsystem is an end-to-end system, the same audio signals are used to train both the sinc convolution layer and the RNN. It should be understood that the steps shown and described herein are merely illustrative and additional, alternative, and fewer number of steps should be considered to be within the scope of the disclosure.

In a first step 602, the process 600 includes training the sinc convolution layer, and a next step 604, training the RNN. The training procedure can include inputting a plurality of audio signals to the sinc convolution layer, where each of the plurality of audio signals includes a verification status of a spoof audio signal or a genuine audio signal. The sinc convolution layer can generate a two dimensional matrix corresponding to each audio signal, where the two dimensional matrix is a result of processing the audio signal with a filterbank of bandpass filters with trainable high and low cut-off frequencies. The two dimensional matrix generated by the sinc convolution layer is then fed to the RNN. The RNN processes the two dimensional matrix through the feed-forward neural network, such as the one shown in FIG. 5B, and generates a prediction score that indicates the likelihood that the respective audio signal is a genuine audio signal or a spoof audio signal. The RNN includes a set of RNN parameters, such as kernel size, number of kernels, feature map size, etc., that can be trained. The prediction score generated by the RNN is compared to the actual value of the audio signal. For example, the second spoof detection subsystem can assign a value '0' to the verification status spoof audio signal and a value '1' to the verification status of genuine audio signal. The second spoof detection subsystem can then generate a loss function based on the prediction score and the value indicating the actual verification status of the audio signal. Similar to that discussed above in relation to process 300, the second spoof detection subsystem can back-propagate the loss function to each convolution layer as well as the sinc convolution layer to train or modify the values of the parameters such that the magnitude of the loss function is reduced. In particular, the values of the low and high cut-off frequencies of the bandpass filters of the filterbank of the sinc convolution layer can be modified as well as the RNN parameters of the various layers of the RNN can be modified until the value of the magnitude of the loss function is below a threshold value. In step 606, the modified RNN parameters and the filterbank frequencies can be used as bandpass filter parameters. These bandpass filter parameters can be used to generate a recognition vector.

In next step 608, the process 600 further includes the sinc convolutional layer receiving an audio signal. Once the sinc convolution layer and the RNN are trained, the trained second spoof detection subsystem 500 can be used to predict the verification status of input audio signals. In next step 610, the sinc convolution layer generates a two dimensional matrix based on the bandpass filtering of the audio signal, where the parameters of the bandpass filters have already been trained. Further, the two dimensional matrix is then provided as an input to the RNN. The RNN processes the two dimensional matrix and generates a prediction function. The second spoof detection subsystem can compare the value of the prediction function with a preset threshold value to predict whether the audio signal has a verification status of spoof audio signal or a verification status of a genuine audio signal 612.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer-implemented method for implementing an anti-spoofing end-to-end neural network architecture, the method comprising:
   receiving, by a computer, a raw audio signal of a call purportedly associated with a verified speaker identity;
   generating, by the computer executing a convolution layer of a signal processing frontend of a neural network architecture, a two-dimensional transformed representation from the received raw audio signal based upon a set of bandpass filter parameters, thereby resulting in a processed audio signal;
   filtering, by the computer executing the signal processing frontend of the neural network architecture, the processed audio signal into frequency channels by applying a filterbank; and
   generating, by the computer executing the neural network architecture, a prediction score for the processed audio signal, the prediction score indicating a likelihood the processed audio signal of the call is associated with a spoof of the verified speaker identity;
   wherein the neural network architecture is trained according to a plurality of raw audio signals having at least one raw audio signal for at least one verified call associated with the verified speaker identity and at least one raw audio signal for at least one spoofed call.

2. The method according to claim 1, further comprising detecting, by the computer executing a classifier backend of the neural network architecture, that the received raw audio signal is a spoofed audio signal in response to determining that the prediction score fails to satisfy a threshold value.

3. The method according to claim 1, further comprising modifying, by the computer, one or more parameters of the neural network architecture based upon back-propagation.

4. The method according to claim 1, wherein generating the transformed representation of the received raw audio signal comprises:
   transforming, by the computer executing a one-dimensional convolution neural network of a signal processing frontend of the neural network architecture, the raw audio signal into a time-frequency representation.

5. The method according to claim 4, wherein, the computer executes a per-channel transformation neural network to generate the processed audio signal based upon the time-frequency representation of the audio signal.

6. The method according to claim 1, further comprising parsing, by the computer, the processed audio signal into a plurality of subframes, wherein each subframe has a fixed duration and overlaps in time with at least one adjacent subframe of the plurality of subframes, and wherein the computer generates the prediction score based upon the plurality of subframes.

7. The method according to claim 1, further comprising generating, by the computer executing a convolution neural network of a classifier backend of the neural network architecture, a L2 normalized vector based upon concatenation of mean and standard deviation of a last max-pooling layer of a plurality of max-pooling layers.

8. The method according to claim 1, further comprising:
   receiving, by the computer, from a computing device, an updated set of bandpass filter parameters, wherein the computer generates the two-dimensional matrix and the prediction score based upon the updated set of bandpass filter parameters.

9. The method according to claim 1, wherein the computer executes a residual neural network of a classifier backend of the neural network architecture to generate the prediction score based upon the two-dimensional matrix and a set of residual neural network parameters.

10. The method according to claim 1, further comprising:
    generating, by the computer executing a residual neural network of a classifier backend of the neural network architecture, a pooled feature map based upon a feature map generated by a statistics layer of the residual neural network; and
    executing, by the computer executing the residual neural network, two fully connected layers of the residual neural network using the pooled feature map.

11. The method according to claim 1, wherein the received raw audio signal comprises at least one of speech and background noise.

12. A computer-implemented method for implementing an anti-spoofing end-to-end neural network architecture, the method comprising:
    executing, by a computer, a neural network architecture on a plurality of audio signals having at least one audio signal associated with at least one spoofed call, the neural network architecture configured to process each audio signal and classify whether each audio signal is associated with a spoofed call, wherein a signal processing frontend of the neural network architecture is configured to process each audio signal based upon a filterbank of bandpass filters to generate a transformed representation of each audio signal, and wherein a classifier backend of the neural network architecture is configured to classify whether the transformed representation of each audio signal is associated with the spoofed call; and training, by the computer, a first set of parameters for signal processing based upon one or more loss functions generated for the audio signals by training, by the computer, a one-dimensional convolution layer and a residual neural network based upon each of the loss functions generated for the plurality of audio signals.

13. The method according to claim 12, further comprising training, by the computer, a second set of parameters for classifying whether each audio signal is associated with a spoofed call.

14. The method according to claim 12, wherein training the first set of parameters further comprises:

modifying, by the computer, at least one set of parameters based upon back-propagation of executing one or more neural networks of the neural network architecture.

15. The method according to claim 12, wherein executing the neural network architecture on the plurality of audio signals further comprises, for each respective audio signal:

generating, by the computer executing the classifier backend, a loss function based upon a prediction score and a predetermined verification status of the respective audio signal, wherein the verification status indicates whether the respective audio signal is associated with a spoofed call.

16. The method according to claim 12, wherein executing the neural network architecture on the plurality of audio signals further comprises, for each respective audio signal:

generating, by the computer executing the signal processing frontend, a transformed audio signal based upon a raw audio signal of the audio signal and the first set of parameters.

17. The method according to claim 12, wherein executing the neural network architecture on the plurality of audio signals further comprises, for each respective audio signal:

generating, by the computer executing the classifier backend, a prediction score based upon the audio signal and a second set of parameters, wherein the prediction score indicates a likelihood the audio signal is associated with a spoofed call.

18. The method according to claim 17, wherein executing the neural network architecture on the plurality of audio signals further comprises, for each respective audio signal:

parsing, by the computer, the audio signal into a plurality of frames, wherein the computer generates the prediction score for the audio signal using the plurality of frames.

19. The method according to claim 12, wherein executing the neural network architecture on the plurality of audio signals further comprises, for each respective audio signal:

generating, by the computer executing the one-dimensional convolution layer of the signal processing frontend, a two-dimensional matrix of the audio signal and a set of bandpass filter parameters in the first set of parameters.

20. The method according to claim 12, wherein executing the neural network architecture on the plurality of audio signals further comprises, for each respective audio signal:

generating, by the computer executing a residual neural network of the classifier backend, a prediction score based upon a two-dimensional matrix of the audio signal and a set of residual neural network parameters in a second set of parameters, wherein the prediction score indicates a likelihood that the audio signal is a genuine audio signal.

21. The method according to claim 12, wherein executing the neural network architecture on the plurality of audio signals further comprises, for each respective audio signal:

generating, by the computer executing a residual neural network of the classifier backend, a loss function based upon a prediction score and a predetermined verification status of the audio signal.

22. The method according to claim 12, wherein training the first set of parameters for signal processing further comprises:

modifying a set of bandpass filter parameters in the first set of parameters and a set of residual neural network parameters in a second set of parameters for classifying whether each audio signal is associated with a spoofed call.

* * * * *